(12) United States Patent
Fakharzadeh

(10) Patent No.: US 7,899,854 B1
(45) Date of Patent: Mar. 1, 2011

(54) HANDHELD COMPUTATIONAL DEVICE

(76) Inventor: Ali M. Fakharzadeh, Lexington, MA (US)

( * ) Notice: Subject to any disclaimer, the term of this patent is extended or adjusted under 35 U.S.C. 154(b) by 1077 days.

(21) Appl. No.: 11/624,869

(22) Filed: Jan. 19, 2007

(51) Int. Cl.
*G06F 3/02* (2006.01)
(52) U.S. Cl. .................................................. 708/134
(58) Field of Classification Search .................. None
See application file for complete search history.

(56) References Cited

U.S. PATENT DOCUMENTS

| | | | | |
|---|---|---|---|---|
| 3,863,060 | A * | 1/1975 | Rode et al. | 708/134 |
| 3,976,975 | A * | 8/1976 | Cochran | 708/130 |
| 4,232,367 | A * | 11/1980 | Youden et al. | 705/38 |
| 5,245,536 | A * | 9/1993 | Hsieh | 705/35 |
| 5,313,396 | A * | 5/1994 | Terpstra et al. | 701/200 |
| 5,587,724 | A * | 12/1996 | Matsuda | 345/156 |
| 6,295,544 | B1 * | 9/2001 | Cheung | 708/134 |
| 6,925,608 | B1 | 8/2005 | Neale et al. | |

OTHER PUBLICATIONS

HP 17B Tutorial, website: http://clem.mscd.edu/mayest/calculators/hp17b.htm, Circa 1999.
HP-17bII+Financial Calculator Quick Reference Guide, CCIM Institute, website: http://www.ccim.com/StudentCenter/BusinessTools/QRG17bII=%204-04online%20format.pdf (2004).
Datamath Calculator Musuem, website: http://www.datamath.org/Related/Canon/FinancialPrinter.htm, 2003.

* cited by examiner

*Primary Examiner* — David H Malzahn
(74) *Attorney, Agent, or Firm* — Nutter McClennen & Fish LLP; Reza Mollaaghababa

(57) ABSTRACT

In one aspect, the invention provides computational device that comprises a processor for performing mathematical computations, and a user interface. The user interface comprises a display and a plurality of functional buttons each associated one of a plurality of variables in a mathematical equation defining a relationship among those variables. In response to the selection of any of the buttons by a user, the processor effects presentation of one or more prompts in the display to invite the user to enter values for variables associated with buttons other than that selected by the user, and upon entry of the last variable value, the processor calculates a value for the variable selected by the user and presents said calculated value in the display.

19 Claims, 32 Drawing Sheets

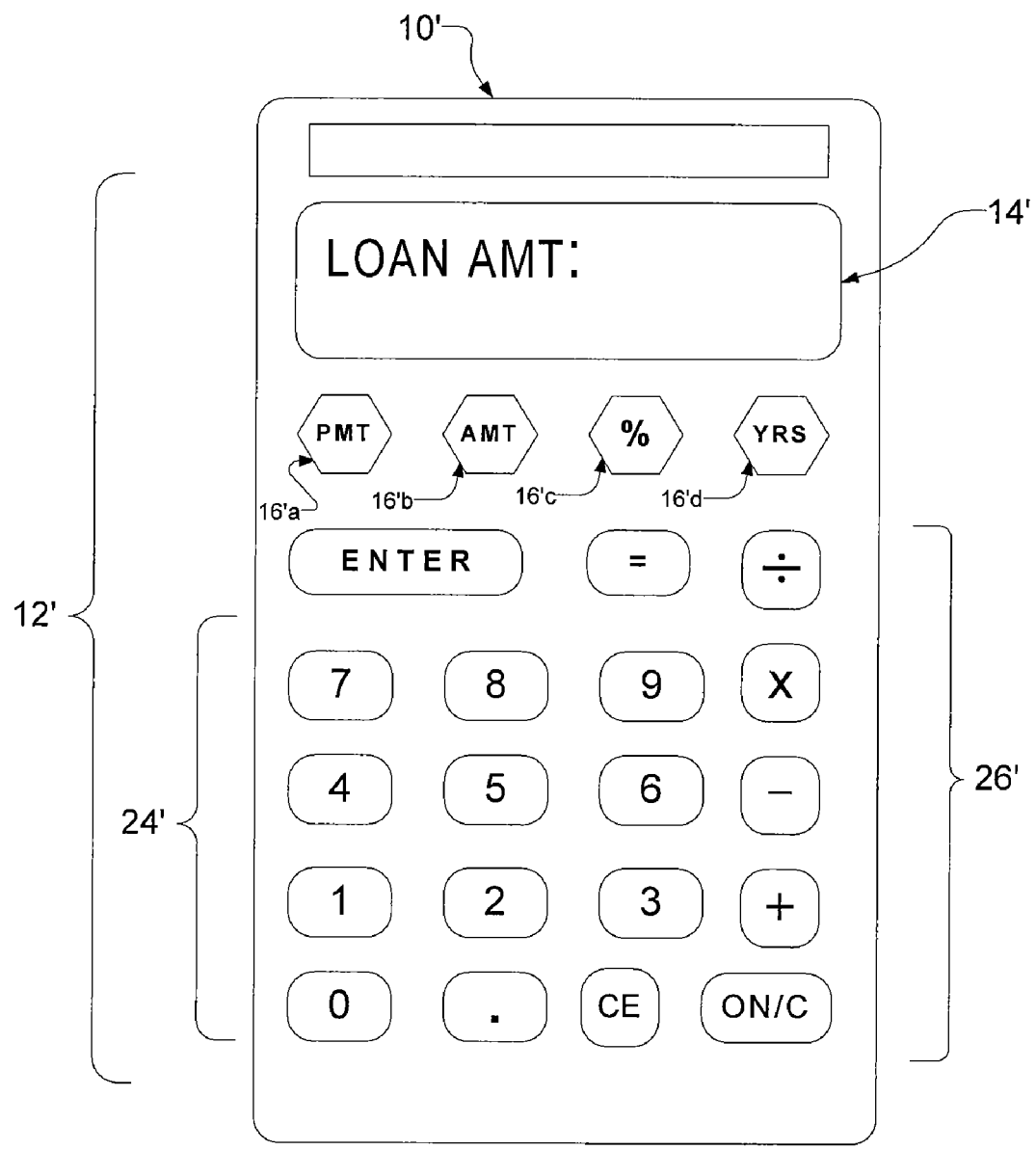

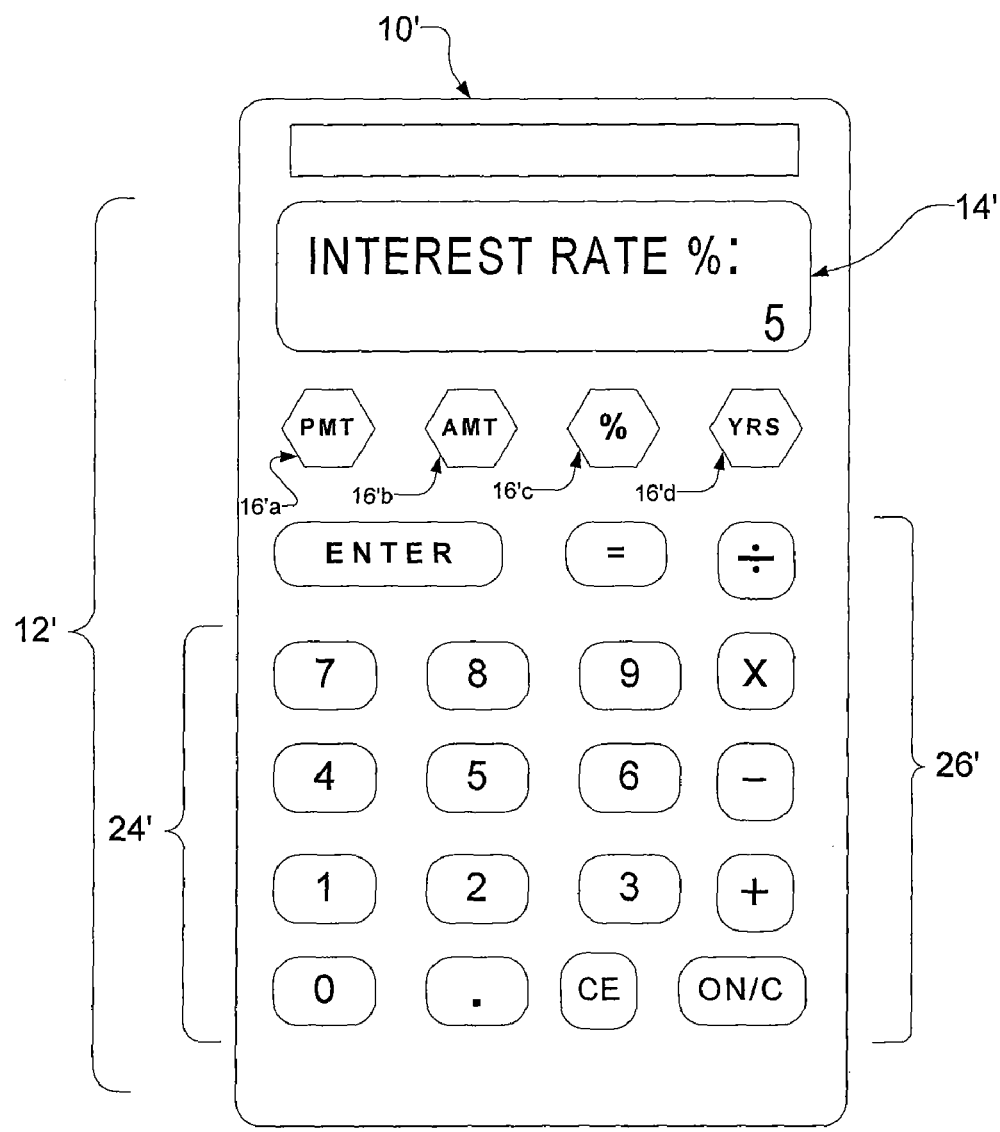

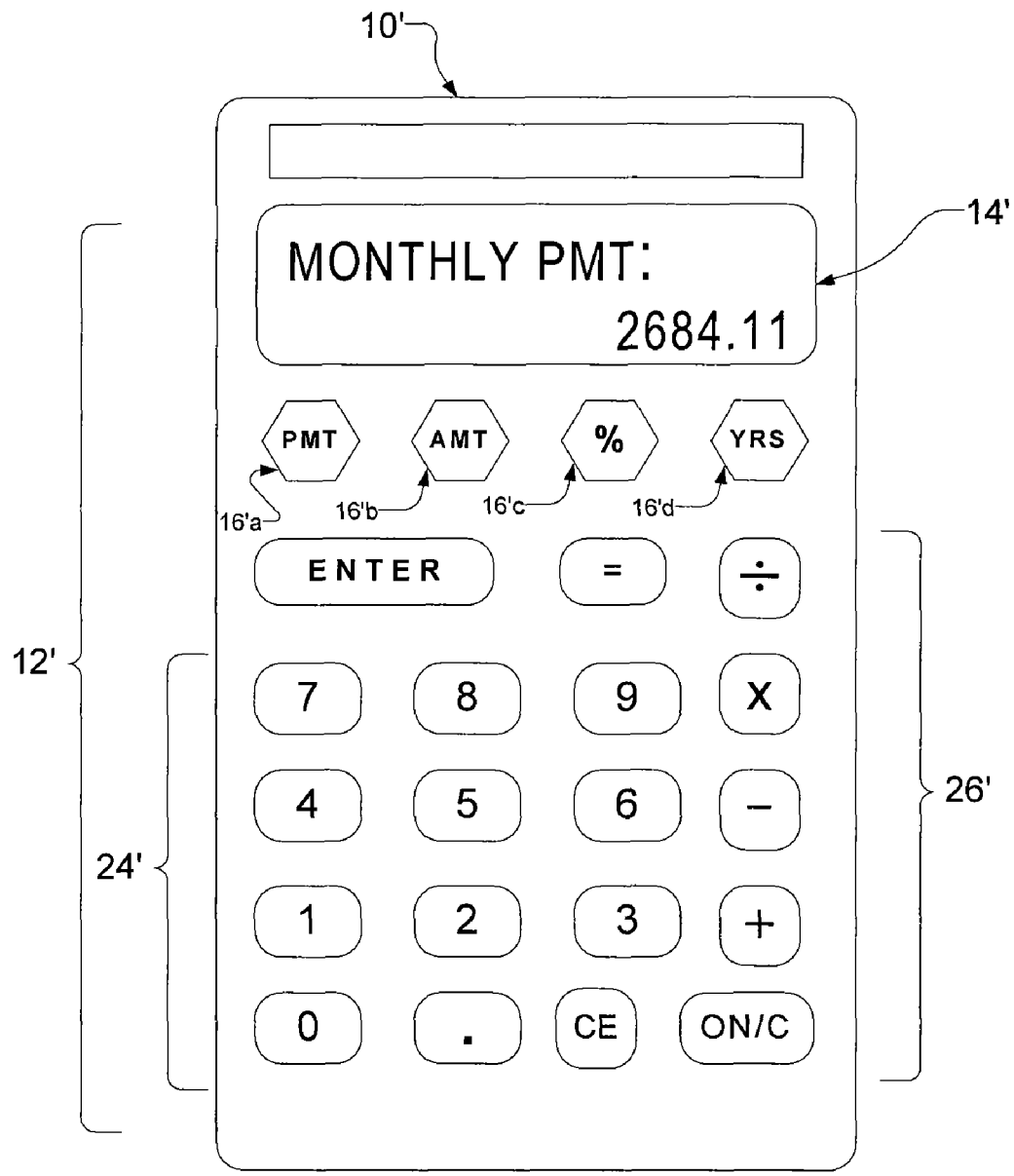

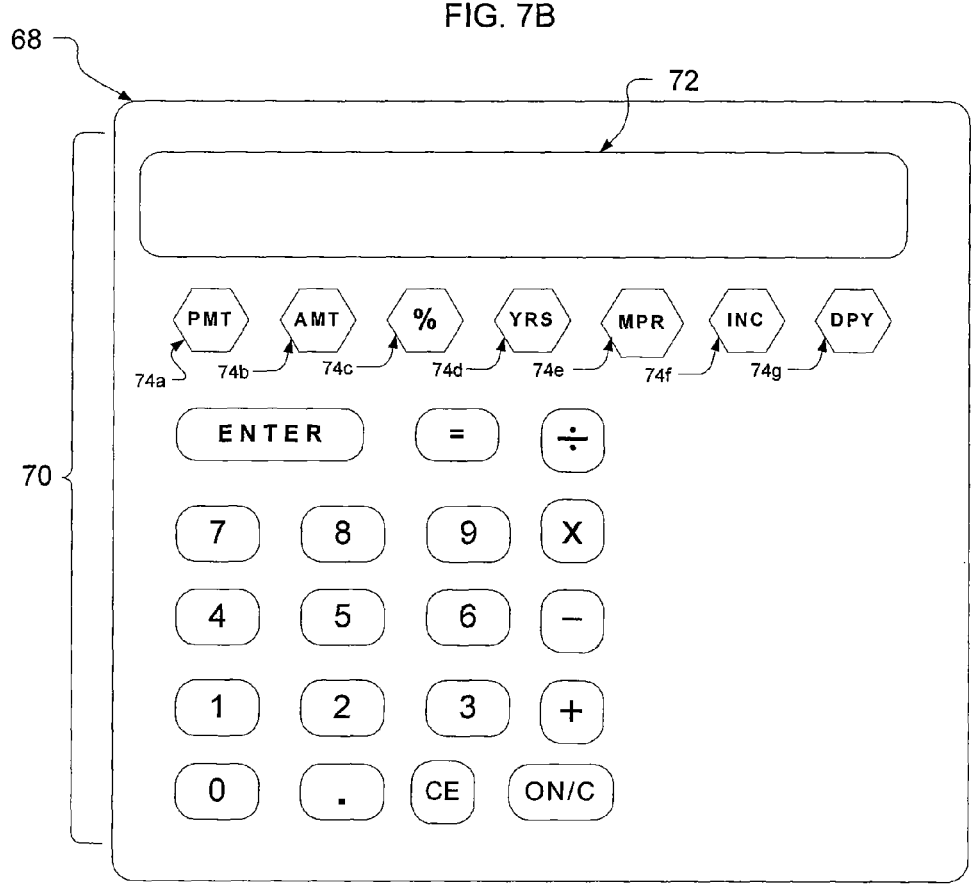

HANDHELD COMPUTATIONAL DEVICE

BACKGROUND OF THE INVENTION

The present invention relates generally to computational devices, and more particularly, to handheld computational devices having an enhanced user interface that facilitates performing mathematical computations.

The purchase of a real-estate or a personal property (e.g., a house (or other real-estate) or a car) typically requires obtaining a loan for financing the transaction. An individual who faces such a prospect may desire to know the requisite monthly payment associated with a loan borrowed at a prevailing interest rate for a given loan duration. Moreover, such an individual may need to compare monthly payments for loans having different interest rates and/or durations. Alternatively, or in addition, such an individual may desire to know a maximum price that she can afford based, for example, on her income. In other cases, an investor may need to quickly calculate the return on money invested at a given interest rate.

Traditionally, mortgage calculations could be performed by reference to tables that provided a compilation of a set of discrete values corresponding to variables involved in a mortgage computation. The use of such tables, however, is cumbersome. Further, one may need to interpolate between the tabulated values to arrive at the value of a desired variable. With the advent of digital calculators, such computations can be performed by programming a calculator. However, such programming of digital calculators is not only beyond the scope of expertise of many individuals, who may not even know the proper equations to program, but it can also be very time-consuming. More recently, a variety of mortgage calculators can be found on the Internet. However, the use of such calculators require having access not only to a computer but also to the Internet. As such, they can typically be utilized only in an office setting or at home. More significantly, such mortgage calculators generally provide a limited functionality (e.g., they only allow calculating the monthly payment associated with a loan).

Accordingly, there is a need for enhanced computational devices that can be readily utilized in different settings to perform computations, such as those typically required for assessing financial implications of obtaining a loan (e.g., for buying real-estate) and/or investing money.

There is also a need for such computational devices that can be employed by a variety of individuals with minimal training.

SUMMARY OF THE INVENTION

In one aspect, the invention provides a computational device that comprises a processor for performing mathematical computations, and a user interface. The user interface comprises a display and a plurality of functional buttons each associated with one of a plurality of variables in a mathematical equation defining a relationship among those variables. That is, the selection of any of the buttons informs the device that the user desires to calculate a value for a variable corresponding to that button, based on the known values of the other variables. In response to the selection of any of the buttons by a user, the processor effects presentation of one or more prompts in the display to invite the user to enter values for variables associated with buttons other than that selected by the user, and upon entry of the last variable value, the processor calculates a value for the variable selected by the user and presents said calculated value in the display.

In a related aspect, the mathematical equation provides the following relation among four variables of a loan equation:

$$P = \frac{L * \left(\frac{R}{100*12}\right)}{1 - \frac{1}{\left(1 + \frac{R}{100*12}\right)^{(12*Y)}}}$$

wherein L denotes the loan amount, P denotes the monthly payment, Y denotes the loan duration (in years), and R denotes the annual interest rate represented as a percentage value (this equation is based on the assumption that the interest is compounded monthly).

In another aspect, the mathematical equation comprises a return-on-investment (ROI) equation defining a relation between variables corresponding to an initial investment value, an interest rate, an investment duration and an appreciated investment value.

In a related aspect, the handheld computational device comprises a memory module for storing instructions for performing the above functionality of the device. For example, the instructions can allow computing a value of each variable of the mathematical equation based on entered values of the other variables. In some cases, the instructions are stored in a firmware.

In one aspect, the present invention provides a computational device, preferably handheld, that includes a processor and a user interface. The user interface can comprise a display, e.g., an LCD, and n functional buttons/keys, each of which is associated with a variable in a mathematical equation defining a relation among n variables, wherein n>=2. Any (n−1) subset of those buttons can be selected to enter values corresponding to variables associated therewith in the display. The remaining $n^{th}$ button can then be selected to cause the processor to calculate a value for the variable corresponding to the $n^{th}$ button based on the mathematical relation and the entered values of the other variables, and to effect presentation of that calculated value in the display.

The terms "buttons" and "keys" are used herein interchangeably, and generally refer to selection elements (e.g., hard-wired and/or implemented in software) that allow a user to communicate with the device, e.g., select variables, enter values for those variables, or effect presentation of a variable value in the display. For example, in some implementations, the selection of a button by a user signals to the device that the user is interested in obtaining a value for a variable associated with that button in terms of known values of the other variables, which can be input into the device by the user, e.g., in response to a series of prompts presented by the device to the user.

In a related aspect, in the above handheld device, each button can be marked by a textual, a graphical or a combined textual/graphical indicator that informs a user of the variable with which that button is associated.

Alternatively, the display can present, for each button, a textual, a graphical and/or a combined textual and graphical indicator in a portion thereof in proximity of the button to inform a user of the variable associated with that button. The indicator can further prompt the user to enter a value for its associated variable.

In another aspect, the handheld device can include a keypad comprising a plurality of numerical keys that can be employed for entering values of the variables associated with the aforementioned buttons.

In a related aspect, the handheld device can be implemented to allow a user to obtain the value of any of the four variables of the following loan equation based on entered values of the other three:

$$P = \frac{L * \left(\frac{R}{100*12}\right)}{1 - \frac{1}{\left(1 + \frac{R}{100*12}\right)^{(12*Y)}}},$$

wherein L denotes the loan amount, P denotes the monthly payment, Y denotes the loan duration (in years), and R denotes the annual interest rate represented as a percentage value (this equation is based on the assumption that the interest is compounded monthly).

In another aspect, a handheld computational device is disclosed that includes a processor and a user interface having n buttons ($n \geq 2$), each of which is associated with a display portion. Each button corresponds to a variable in a mathematical equation that defines a relation among n variables, wherein any (n−1) of the buttons can be selected to enter values for corresponding variables in their respective display portions. Subsequently, the remaining $n^{th}$ button can be selected to cause the processor to calculate a value of the variable corresponding to the $n^{th}$ button based on that mathematical relation and the entered values of the other variables. The processor can then effect the presentation of the calculated value in a display portion associated with said $n^{th}$ button. In some embodiments, the device provides the last entered value of a variable as a default value of that variable upon selection of a button associated with that variable in a subsequent computational session. The user can change that default value, if needed.

The above handheld device can further comprise memory for storing instructions for computing a value for any of the n variables from said mathematical relation, based on values entered for the other (n−1) variables. In some embodiments, these instructions are stored in firmware.

In other aspects, the invention provides a handheld computational device that comprises a processor for performing mathematical computations as well as a user interface. The user interface comprises a plurality of selectable elements each associated with one of a plurality of variables in a mathematical equation that defines a relationship among those variables. The user interface can further include a display having a plurality of segments, e.g., logical segments, each of which is associated with one of those elements such that selecting that element allows entry of a numerical value for a respective variable in that display segment or effects presentation of a numerical value calculated by the processor, based on the mathematical relation and previously-entered values of the other variables, in that segment.

In yet another aspect, the invention provides a handheld computational device that comprises a processor for performing mathematical operations and a user interface that comprises n buttons and a plurality of display portions. Each button is associated with one of the display portions and each button corresponds to a variable in a mathematical relation containing n variables, each of which is defined based on values of the others. The handheld device is configured such that the selection of any (n−1) subset of those buttons allows entry of values corresponding to their associated variables in respective display portions thereof. Upon entry of those (n−1) variable values, the $n^{th}$ button can be selected to effect calculation by the processor of the value corresponding to the remaining $n^{th}$ variable, based on the mathematical relation and the entered values of the other variables. The processor further effects the display of the calculated value in the display portion associated with the $n^{th}$ variable.

In yet another aspect, the invention provides a graphical user interface that comprises n selectable elements (e.g., graphical elements) each associated with a variable in a mathematical relation that defines a relationship among n variables, wherein $n \geq 2$. The interface further includes n display windows each corresponding to one of the elements, wherein any (n−1) of those elements can be selected to enter values for variables associated with those elements. The remaining $n^{th}$ element can then be selected to cause display of a value corresponding to the variable associated with that $n^{th}$ element in a display window corresponding thereto. The displayed value of the $n^{th}$ element is computed based on the mathematical relation and values previously assigned to the other variables.

In another aspect, a computational device is disclosed that comprises a processor, and a user interface. The user interface includes a display and a plurality of functional buttons each associated with one of a plurality of variables in an equation defining a relation among an amount of a loan, the loan duration, an interest rate of the loan, and a periodic payment for paying off the loan. The interface provides three additional buttons one of which is associated with entry of a start date, another with entry of an end date of the loan, and the third with entry of a date at which a pay-off amount of the loan is desired. Another button is provided in the interface that is associated with calculating the pay-off amount of the loan at a given date. In response to selection of the button associated with the pay-off amount, and subsequent to entry of relevant parameters of the loan, the processor calculates the pay-off amount and causes its presentation in said display.

In another aspect, a handheld electronic device is disclosed that includes a body sized and shaped for holding by one hand of a user. The device further includes a user interface comprising a plurality of buttons for operating the device and at least one securing element coupled to the body. The securing element is adapted for engagement with at least one digit of the user's hand to facilitate holding the device so as to allow the user to operate the device, via its user interface, with one or more other digits of that same hand. In some embodiments, the securing element can comprise a sleeve coupled to a surface of the device body, e.g., a back surface, that is adapted for insertion of at least one digit of the user's hand therein. In another embodiment, the securing element can comprise at least a groove formed in a surface of the device body to provide a frictional fit with a digit of a user's hand. In yet another embodiment, the securing element can comprise a hook-and-loop fastener for coupling a portion of the user's hand to the device body while leaving at least one digit of that hand (e.g., the thumb) free for operating the device.

By way of example, in a related aspect, two indentations are formed on the back surface of the handheld computational device in each of which a rod is disposed, preferably substantially flush with the back surface. A hook-and-loop fastener is then coupled at each end to one of the rods. In another case, a recessed well is formed on a back surface of the device, and a rotationally adjustable cuff is provided that surrounds the perimeter of the well substantially flush with the back surface. Two rods can be coupled to the cuff, and a hook-and-loop fastener can extend between the rods.

Further understanding of the invention can be obtained by reference to the following detailed description.

BRIEF DESCRIPTION OF THE DRAWINGS

FIG. 7B is a schematic top view of a computational device in accordance with yet another embodiment of the invention.

DETAILED DESCRIPTION

The present invention provides computational devices, preferably handheld, that allow a user to readily obtain the value of any variable of a mathematical relation, which defines a relationship among a plurality of variables, based on entered values of the other variables. In many embodiments discussed below, various features of such devices of the invention, and in particular their user interface, are described by reference to a hand-held implementation that can be utilized as a mortgage calculator. It should, however, be understood that the teachings of the invention are not limited to mortgage calculators, but are equally applicable to any computational device that can allow obtaining a value for a variable of a mathematical relation based on values assigned to the other variables of that relation. For example, a computational device according to the teachings of the invention can be employed in connection with loans having simple or compound interests (e.g., to determine a required monthly payment for a loan based on the interest rate, the amount, and the duration of the loan). Further, although in many of the following embodiments, handheld implementations of exemplary computational devices of the invention are discussed, the computational devices of the invention can also be implemented as desktop devices.

Figure 1A:
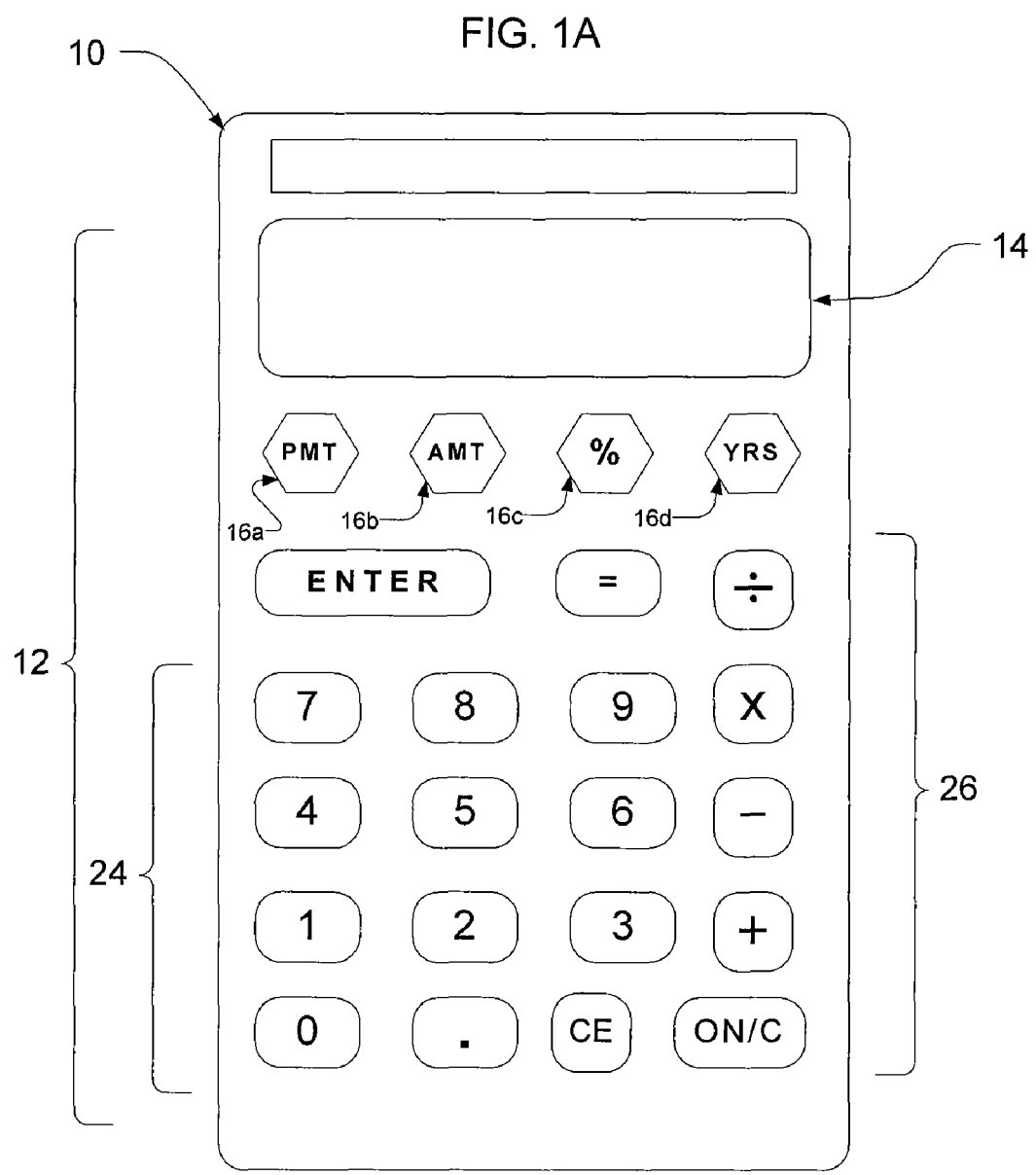
FIG. 1A is a schematic top view of a computational device according to the one embodiment of the invention.
Figure 1B:
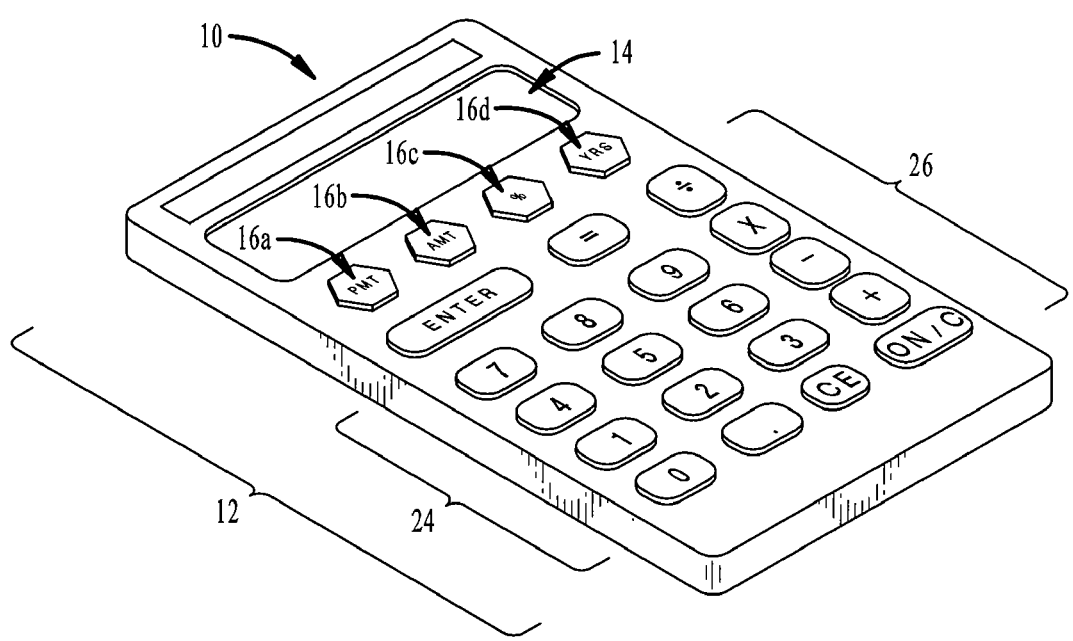
FIG. 1B is a perspective view of the device of FIG. 1A, FIGS. 1C-1H schematically depict an exemplary use of the device of FIGS. 1A and 1B for calculating the monthly payment associated with a loan/mortgage obtained at a given interest rate and for a given duration.

With reference to FIGS. 1A and 1B, an exemplary handheld computational device 10 in accordance with one embodiment of the invention is suitable for calculating any of the following four variables of the loan/mortgage equation below (Eq. 1) based on the entered values of the others. These four variables comprise: a loan amount (AMT) designated as L, a monthly mortgage payment (PMT) designated as P, a lending period in years (YRS) designated as Y, and annual interest rate (%) designated as R:

$$P = \frac{L * \left(\frac{R}{100 * 12}\right)}{1 - \frac{1}{\left(1 + \frac{R}{100 * 12}\right)^{(12*Y)}}},$$ Eq. 1 wherein the above equation is based on the assumption that the interest is compounded monthly (this is reflected by the factor 12 in the equation). The factor 100 in the above equation is employed to convert the value of the interest rate entered by a user as a percentage value into a decimal representation. It should be understood that the above equation can be readily modified to be based on a different temporal cycle for compounding the interest, or to accommodate the entry of the interest rate in a decimal representation.

Although the above relation is presented as defining the monthly payment variable (P) in terms of the others, those having ordinary skill in the art appreciate that the above relation can be manipulated algebraically in a manner known in the art to define any of the other variables (i.e., loan amount, lending period, or interest rate) based on values assigned to the remaining three variables. By way of example, the following equation (Eq. 2) defines the loan amount (AMT) in terms of the other variables:

$$L = \frac{P * 100 * 12}{R} * \left(1 - \frac{1}{\left(1 + \frac{R}{100 * 12}\right)^{12*Y}}\right)$$ Eq. (2)

The exemplary device 10 (herein also referred to as a mortgage calculator) includes a user interface 12 that comprises a display 14 and four functional buttons/keys 16a, 16b, 16c, and 16d, herein collectively referred to as buttons 16, each of which is associated with one of the above variables (i.e. monthly loan payment, loan amount, interest rate, and lending period).

The exemplary interface 12 further includes a keypad 24 comprising a plurality of numerical keys that allow assigning values to the aforementioned variables and presenting the assigned values in the display 14. An ENTER key provided in the interface can then be employed to pass the assigned values to a processing element of the device, as discussed further below. The exemplary device 10 is also equipped with functionality for performing basic mathematical operations (i.e., addition, subtraction, division and multiplication). That is, in addition to a dedicated mortgage calculator, the exemplary device can also be employed as a general-purpose calculator. More specifically, the exemplary device 10 includes a plurality of operational keys 26 that provide the required interface for performing such operations in a conventional manner. Moreover, the buttons for performing mathematical operations can be employed to facilitate the entry of numerical values for variables of the above mortgage equation (or other mathematical equations in alternative embodiments). For example, as discussed in more detail below, in response to a prompt from the device to enter a value for a variable (e.g., the loan amount), a user can enter a series of numerical values separated by one or more of the "+", "−", "×" and/or "÷" buttons to cause pairwise addition, subtraction, multiplication and/or division of those values such that upon pressing the ENTER key, the resultant value is assigned to the variable (such an entry of a series of numerical values before the first invocation of the ENTER key or between two successive invocations of the ENTER key is herein referred to as a "sub-session"). For example, rather than entering a single value for the loan amount, a user can employ the "−" sign to subtract costs associated with obtaining the loan from a nominal loan amount to obtain an effective value of the loan amount (i.e., the amount that is actually accessible to the user for the purchase of a personal or a real-estate property). Further, a key labeled "On/C" allows clearing numerical values entered during a subsession (e.g., after pressing the ENTER key), as well as switching on the device. Another key labeled "CE" allows clearing the last numerical value that was entered. In some embodiments, the computational device automatically shuts off if no keys are pressed for a selected time period (i.e., after a pre-defined time-out period). In some cases, before the shut-off, the device saves the values entered during the last session and hence allows a user to continue a previously-initiated computation upon switching on the device.

In this exemplary embodiment, each button can be selected by a user to inform the device that the user is interested in obtaining a value associated with that button. In response to such a selection, the computational device prompts the user to enter values for the other three variables, in a manner discussed in more detail below. Upon entering a value for the last of those three variables, the device displays in the display 14 the value of the variable selected by the user (i.e., the initially unknown variable). For example, the user can select the button 16a to indicate its interest in obtaining the value of the monthly payment of a loan obtained at a given interest rate and for a given duration. In response to the user's selection, the device prompts the user to enter, e.g., sequentially, the values of the other three variables (i.e., the loan amount, the interest rate (e.g., the annual interest rate) and the loan duration (e.g., in units of years)). Upon entering the last value, the device displays the value of the monthly payment, calculated, based on the values of the other three variables, and by utilizing the above equation. As noted above, when entering a variable value, the user can provide a series of numerical values and utilize the buttons for performing mathematical operations to obtain a resultant value based on those values, which can then be conveyed to the device by pressing the ENTER key. By way of example, a user can enter a nominal loan amount and subtract from that amount one or more costs associated with obtaining the loan to arrive at an effective loan amount. The effective loan amount can then be utilized, together with the loan duration and a monthly payment value, to obtain an effective interest rate for the loan (i.e., an interest rate that takes into account not only the nominal loan amount but also costs associated with securing the loan). By way of example, a user can employ such a feature to compare different loans, which may have the same nominal interest rates but different effective interest rates due to variations in costs associated with obtaining them.

In this exemplary embodiment, each button is labeled with a textual indicator to inform a user of the variable with which that button is associated. More particularly, the button 16a is labeled as "PMT" indicating that it is associated with the variable corresponding to monthly payment. The buttons 16b and 16c are labeled as "AMT" and "%" to indicate their associations with variables corresponding to the loan amount and the annual interest rate, respectively. And the button 16d is labeled as "YRS" to inform a user that it is associated with the variable corresponding to the lending period (years). In this implementation, the association of a button and a variable indicates that the selection of that button would signal to the device the desire to calculate a value for that variable. In other embodiments, the association of a button with a variable indicates that the selection of the button allows entry of a value for that variable or that the selection of the button effects calculation and display of a value for that variable based on previously-entered values of the other variables.

Although in this exemplary embodiment the buttons 16 are in the form of software-enabled hard buttons, in other embodiments the buttons 16 can be in the form of programmable buttons ("soft" buttons) each of which can be programmed, either statically or dynamically, to provide association with a particular variable. Such soft buttons can provide additional flexibility as they allow the reuse of the buttons for different functions. For example, in an implementation of this exemplary embodiment in which soft buttons are utilized, each button can be reprogrammed to change its variable association. The device 10 also includes a solar cell, in addition to a battery (e.g., a rechargeable battery), that provides power to the device.

Figure 1C:
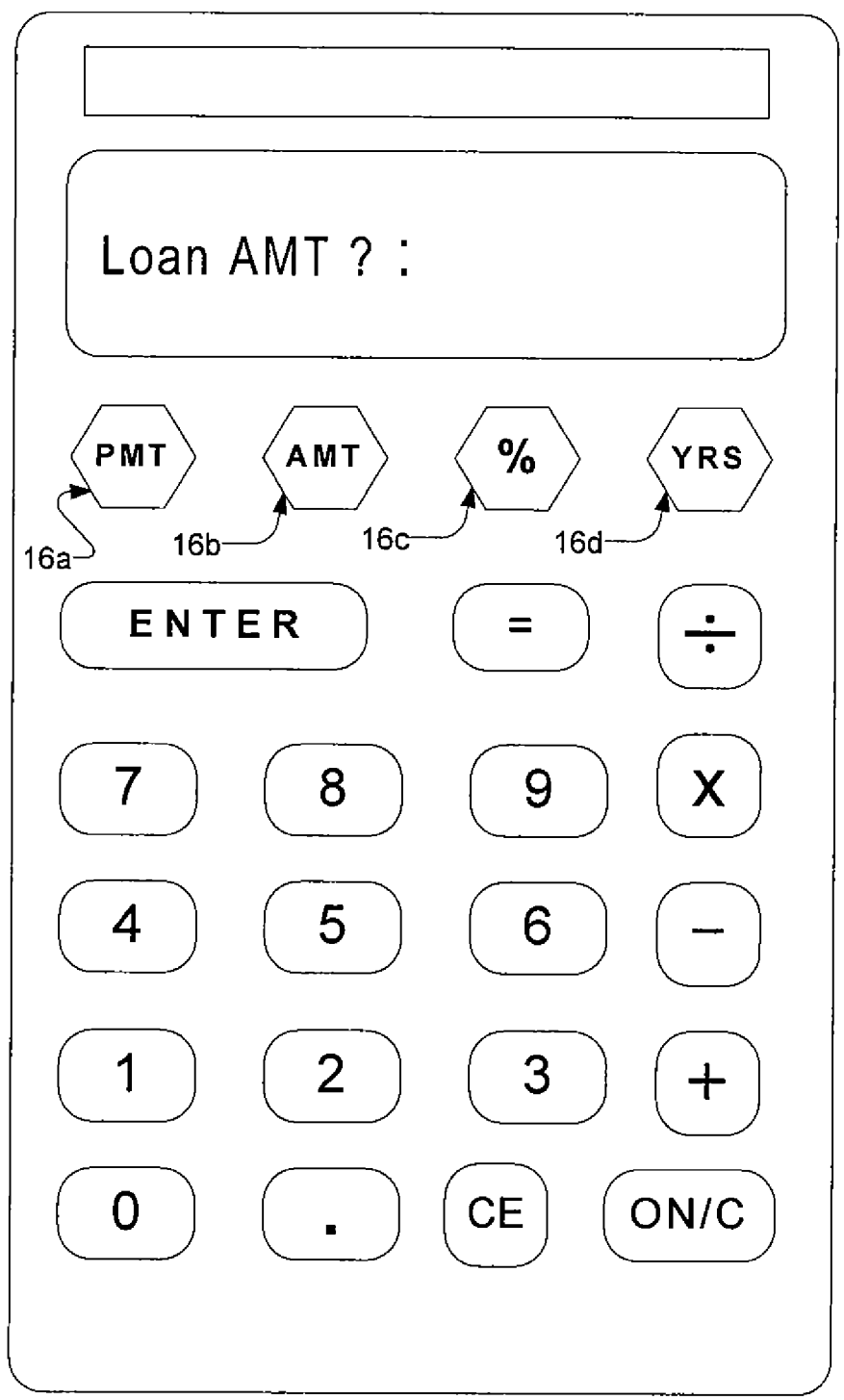
Figure 1D:
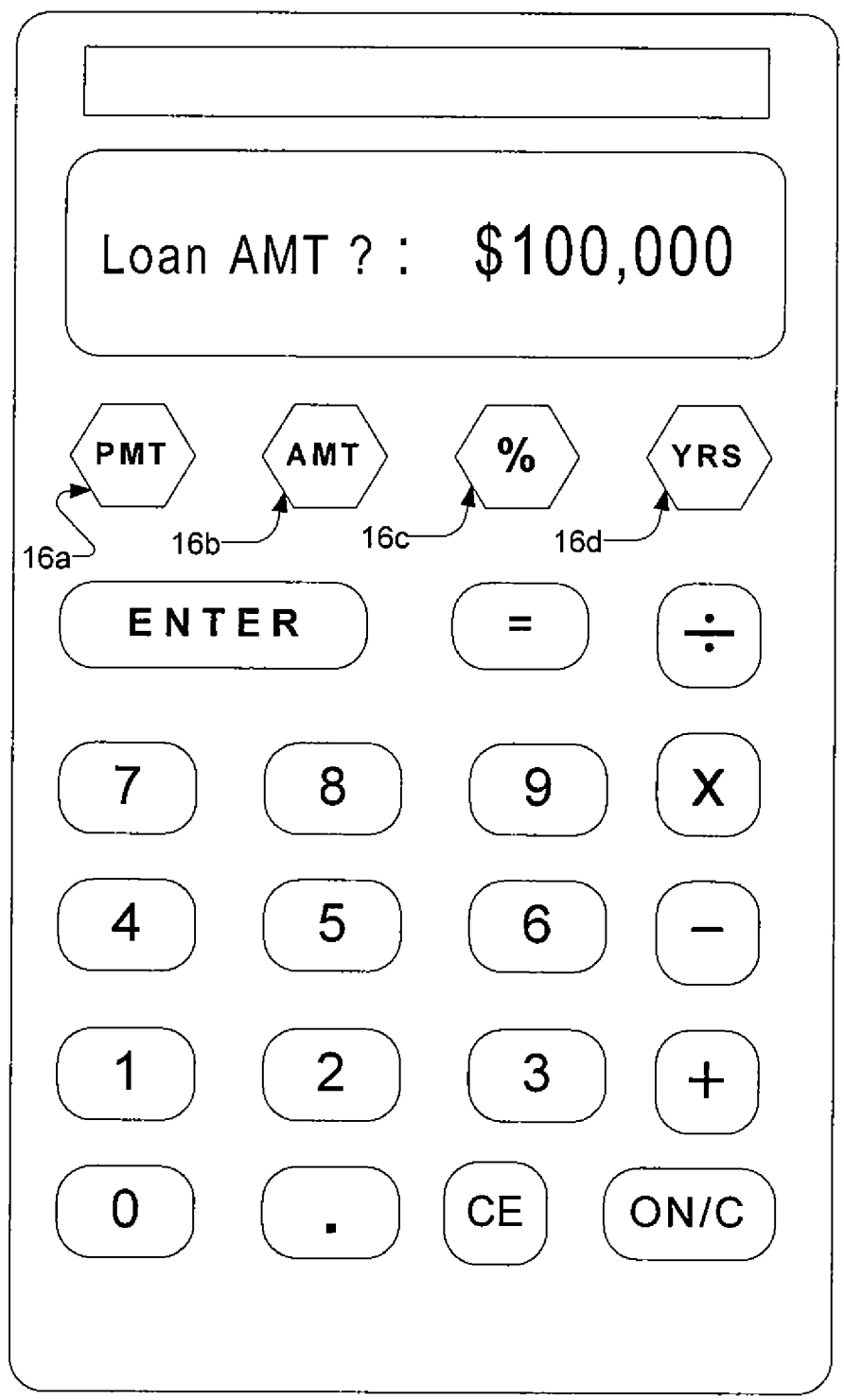
Figure 1E:
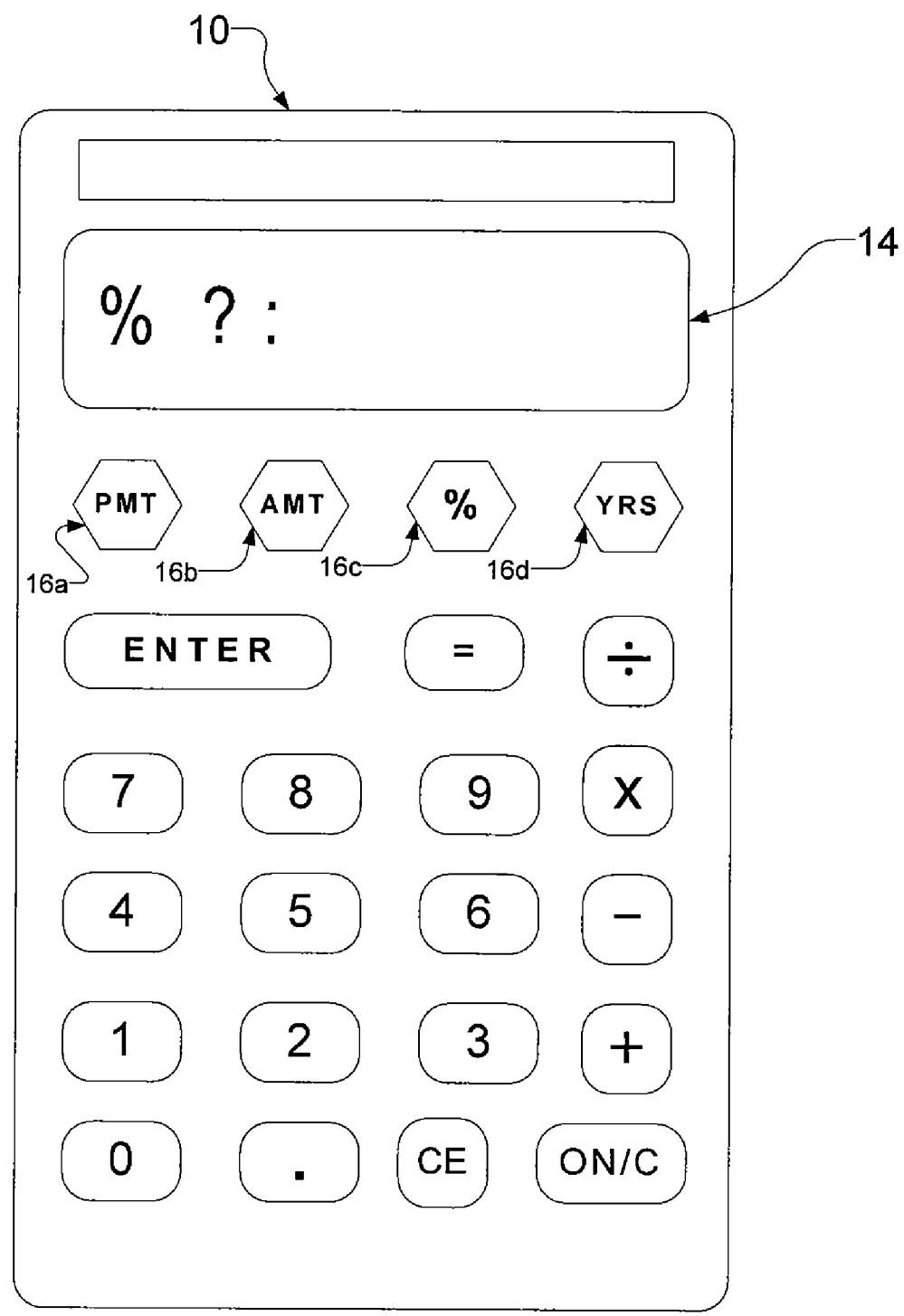
Figure 1F:
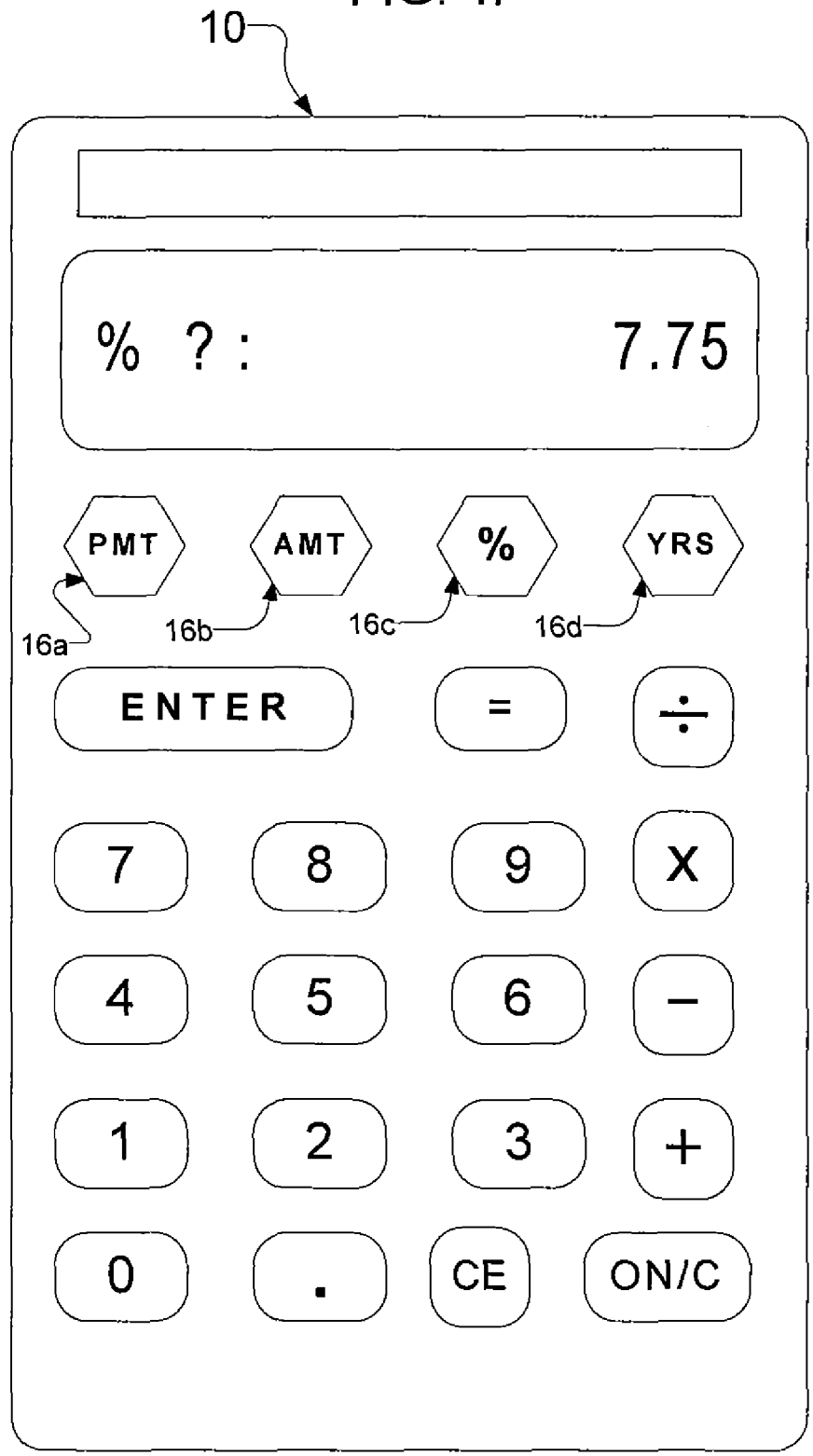
Figure 1G:
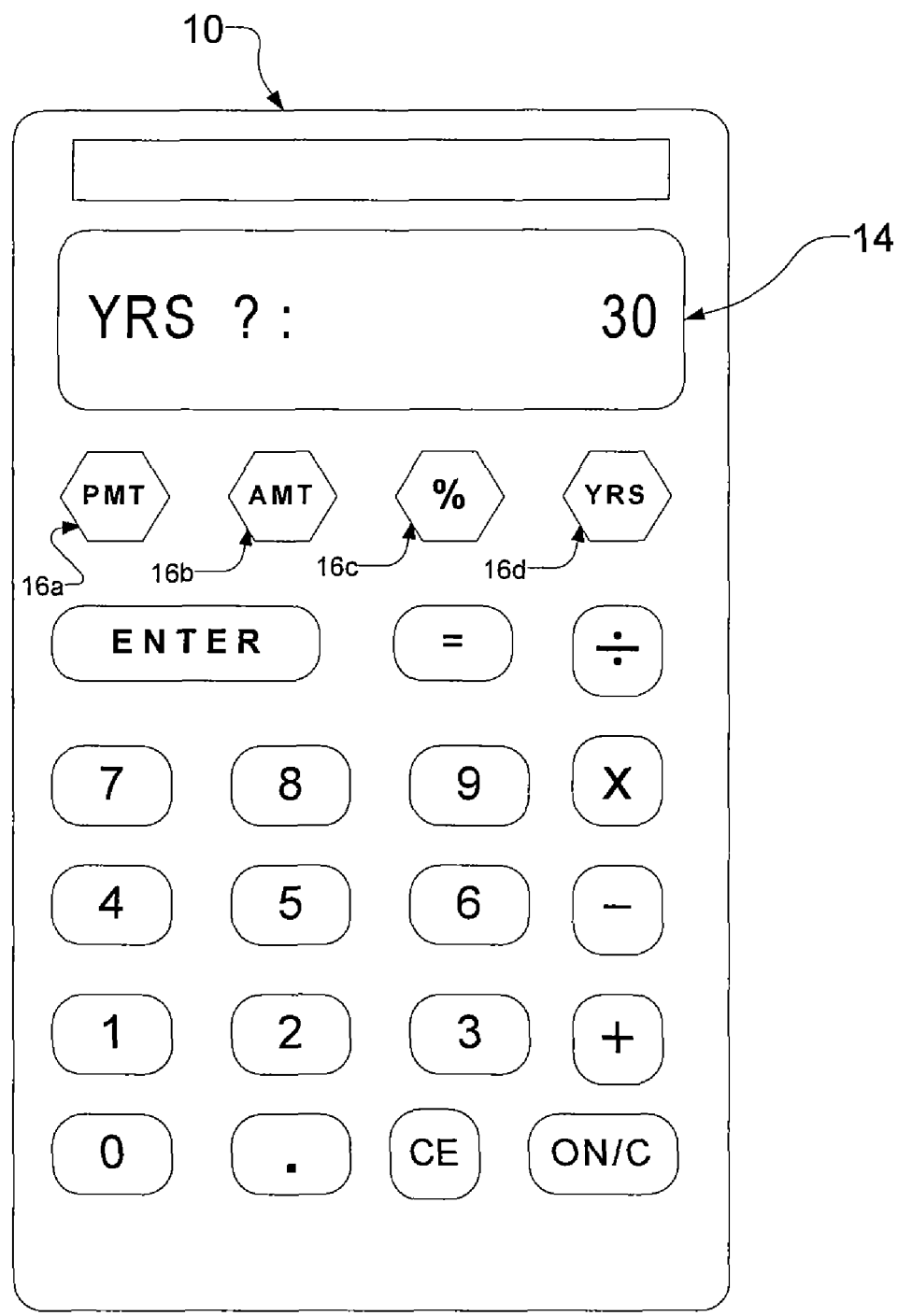
Figure 1H:
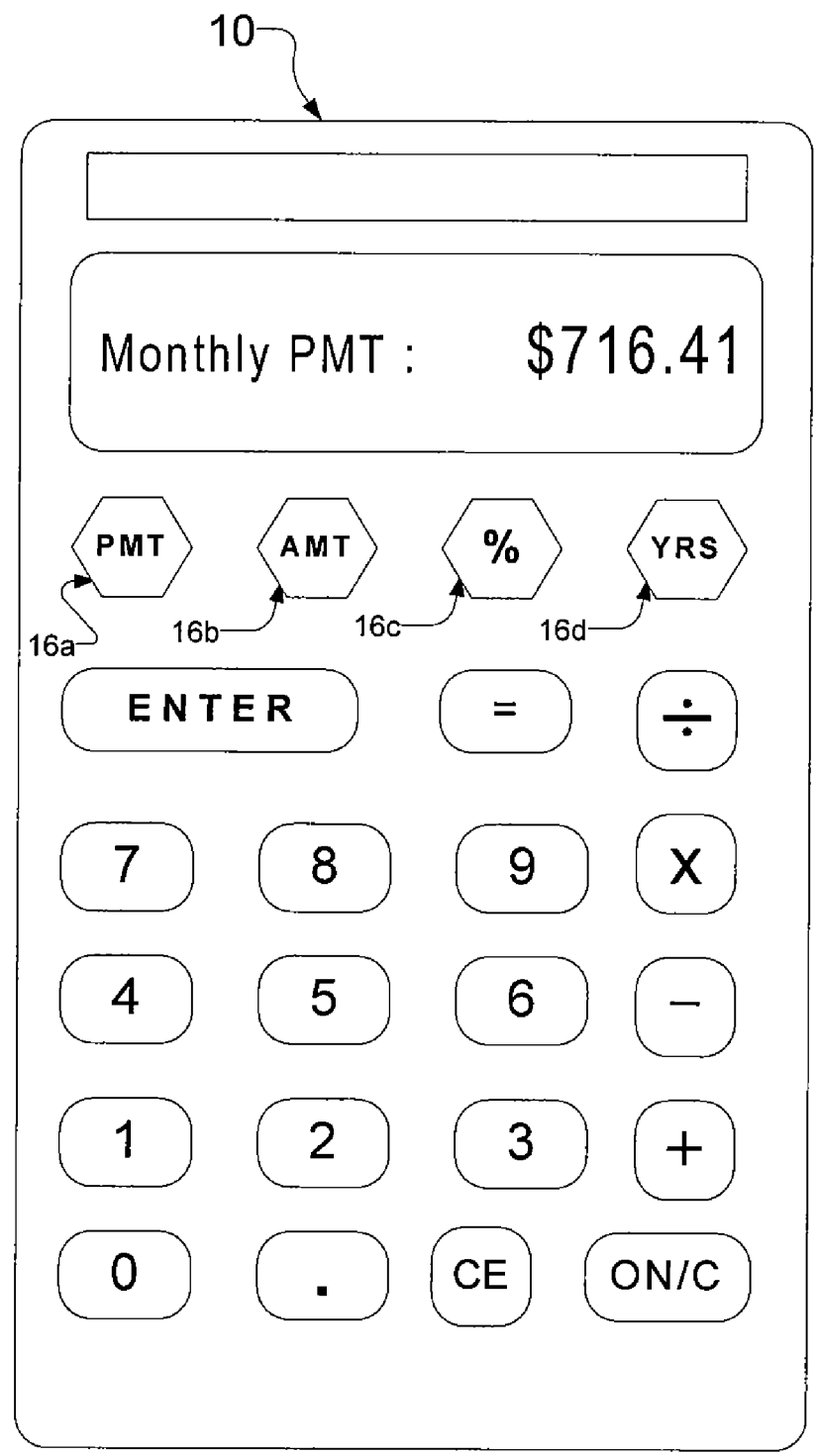

As noted above, any of the four buttons 16 can be selected by a user to indicate the user's desire to calculate a value for the variable associated with that button. Upon such selection, the device prompts the user (e.g., by displaying textual and/or graphical indicators in the display 14) to enter values for the other three variables, and calculates and displays the value of the variable desired by the user based on the entered values of the other variables. By way of example, in this exemplary embodiment, upon selection of the button 16a (e.g., by pressing the button), which corresponds to the monthly payment, the device can prompt the user (e.g., by displaying "LOAN AMT?:" in the display 14) to enter a value of the loan amount, as shown schematically in FIG. 1C. The user can then employ the keypad 26 and the ENTER key to enter the value of the loan amount, e.g., 100,000 dollars as shown in FIG. 1D. Upon entry of the loan amount, the device prompts the user (e.g., by displaying "% ?:" in the display 14) to enter the value of the interest rate, as shown in FIG. 1E. Upon entry of the interest rate value, e.g., an annual rate of 7.75% shown in FIG. 1F, the device prompts the user (e.g., by displaying "YRS?:" in the display 14) to enter a value for the loan duration, as shown in FIG. 1G. Once a value for the loan duration is entered, e.g., 30 years in this example, the device displays the value of the monthly payment (i.e., the value of the variable initially selected by the user) calculated based on the above mortgage equations and the entered values of the other variables, as shown in FIG. 1H. In this exemplary embodiment, the numerical value of the calculated monthly payment is presented in the display 14 together with a descriptive indicator ("Monthly PMT?:") to further help the user associate the presented numerical value with the variable of interest. The user can then press the ENTER button to reset the device (to return to the display shown in FIG. 1A) and start a new calculation, if desired.

It should be understood that a user of the device 10 can obtain a value for any of the other variables based on entered values of the other three in a similar manner. For example, a user who is interested in knowing a loan amount that corresponds to given values of the monthly payment, interest rate and loan duration, can select the button corresponding to the loan amount (e.g., the button 16b in this exemplary embodiment). Upon such selection, the device will prompt the user, in a manner similar to that discussed above, to enter values for the monthly payment, interest rate and duration of the loan. Once these values are entered, the device calculates and displays the respective value of the loan amount based on the entered values of the other variables.

In other alternative embodiments, a user can enter values for the known variables by pressing buttons corresponding to those variables and employing a keypad, and can subsequently select the button associated with the fourth variable (i.e., the unknown variable) to cause the device to calculate a value for that variable and to display the calculated value.

Figure 2B:
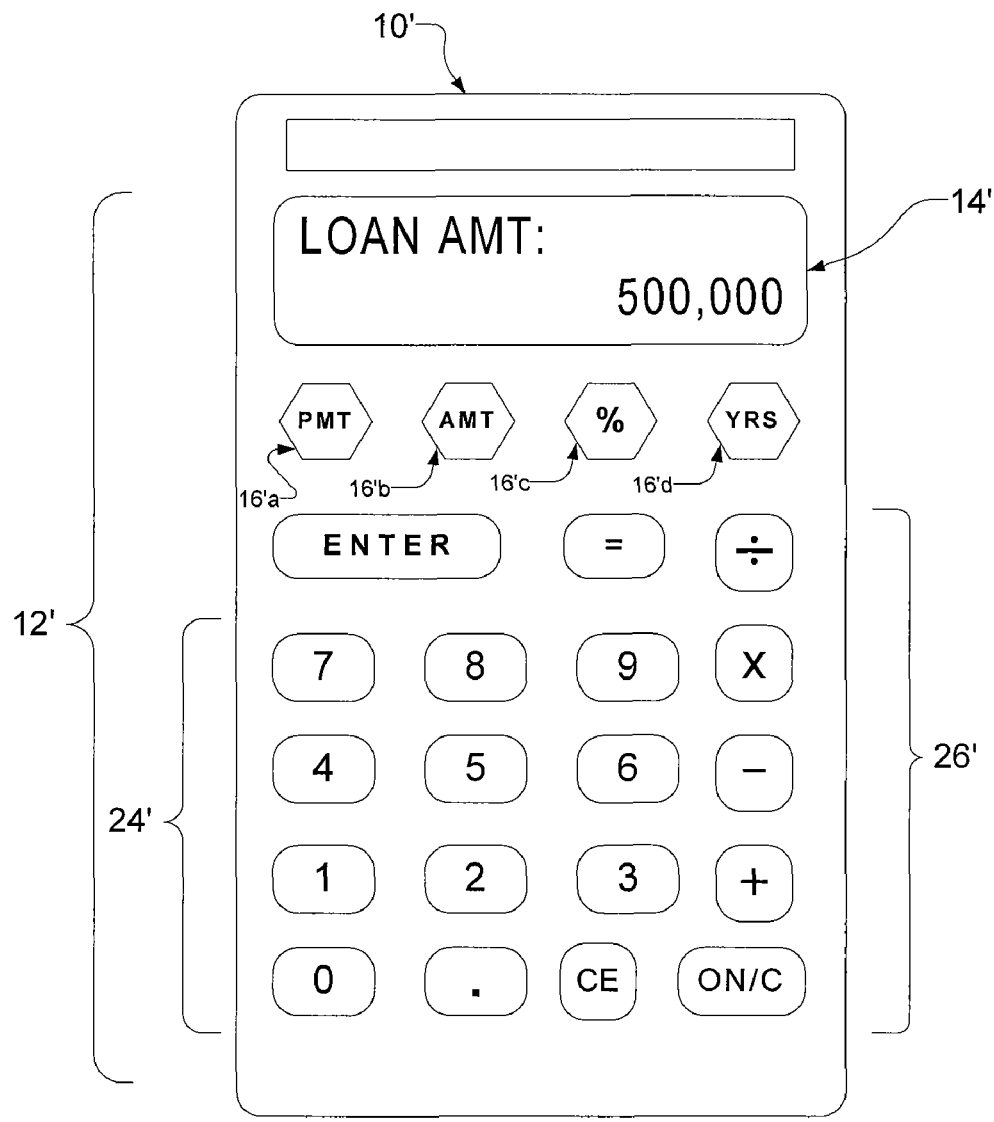
FIG. 2A is a schematic top view of a computational device according to another embodiment of the invention, FIGS. 2B-2E schematically depict an exemplary use of the device of FIG. 2A for calculating the monthly payment associated with a mortgage/loan obtained at a given interest rate and for a given duration.

For example, with reference to FIG. 2A, another embodiment of a computational device 10' according to the teachings of the invention includes a user interface 12' that allows a user to enter values for any three of the above variables in order to obtain the respective value of the fourth based on the above mathematical relation, in a manner discussed in detail below. More specifically, the user interface 12' includes a display 14' and four buttons/keys 16'a, 16'b, 16'c, and 16'd, herein collectively referred to as buttons 16', each of which is associated with one of the above variables (i.e., loan amount, monthly loan payment, lending periods in years, and annual interest rate). That is, each button can be selected to enter a value corresponding to the variable associated therewith in the display 14' or to effect presentation of a value corresponding to its associated variable, based on previously-entered values of the other variables, in the display.

With continued reference to FIG. 2A, any three of the four buttons 16' can be selected, e.g., sequentially, to enter values corresponding to their respective variables in the display 14'. The fourth button, i.e., the button associated with the variable whose value is desired based on the entered values of the others, can then be selected to effect presentation of a value for the fourth variable in the display 14', based on the above mathematical relation as well as the entered values of the other three variables.

For example, a user who is interested in determining the monthly payment of a given mortgage/loan (e.g., 500,000) at a selected annual interest rate (e.g., 5%), and for a selected duration (e.g., 30 years) can employ the exemplary device 10', and in particular its user interface, in the following manner. By way of example, upon selecting (e.g., pressing) the button "AMT," the user is prompted (e.g., by displaying "Loan AMT:") to enter a value for the variable corresponding to the loan amount, as shown schematically in FIG. 2A. The user can then employ the numerical keys 24' to enter a desired value in the display (e.g., $500,000 as shown schematically in FIG. 2B), and select the ENTER key to submit entered value for that variable. In this exemplary implementation, the values of the variables are assumed to be in dollars (though other denominations and currencies can also be employed).

Figure 2C:
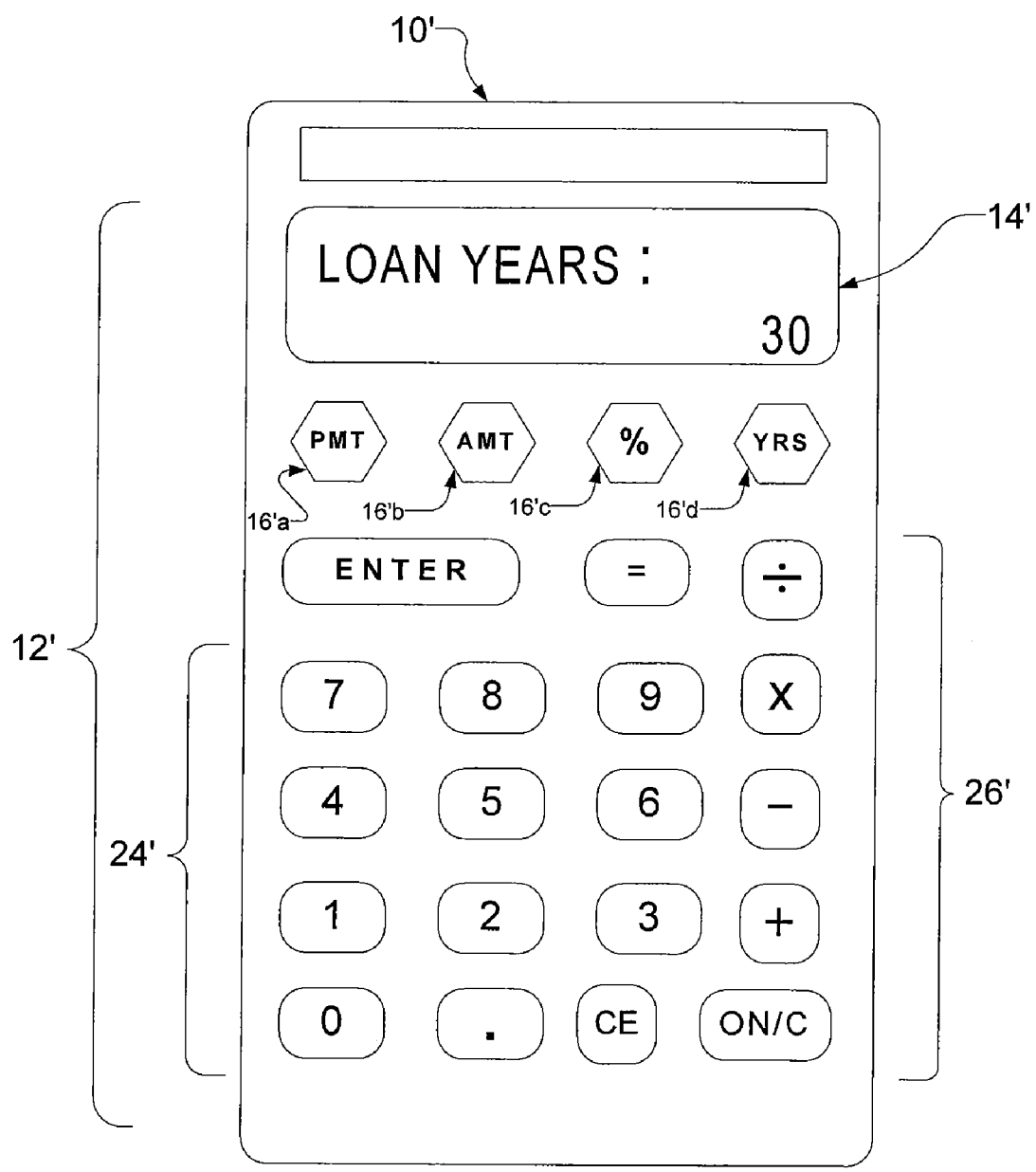

Upon subsequent selection of the button 16'd, the device prompts the user to enter a value for the duration of the loan in years (e.g., by displaying LOAN YEARS: in the display 14'), as shown schematically in FIG. 2C. In this example, the user has chosen 30 years for the loan duration (in this implementation, it is assumed that the duration is in terms of years, though other time durations can be implemented in other embodiments). In a similar fashion, a value for the third variable corresponding to the annual interest rate can be entered by selecting the button 16'c, as shown in FIG. 2D. Subsequently, the button associated with the fourth variable (that is, the variable for which no value has been entered), which in this example is the button 16'a associated with the monthly payment, can be selected to cause presentation of a value corresponding to that fourth variable, based on the above mathematical relation (Equation 1) and the entered values of the other three variables (in this example: loan amount, interest rate and loan duration), as shown in FIG. 2E. As discussed in more detail below, the selection of the fourth button, in this case the button 16'a, can cause a processor of the device 10' to calculate the value of the fourth variable and to effect its presentation in the display.

In the above example, the sequence by which the buttons corresponding to the variables for which values are selected can be different than that discussed above. In fact, those variable values can be entered in any desired sequence. Moreover, the device 10' can be utilized to calculate the value of any variable (and not only the monthly payment discussed above) based on entered values of the other three.

In some embodiments, upon selection of a button by a user to enter a value corresponding to a variable associated with that button, a default value for that variable is presented in the display. The user has the option of changing the default value by employing the numerical buttons, or can alternatively leave the default value unchanged. The default value can be, e.g., the value utilized for that variable in a previously-performed calculation.

A variety of hardware and software architectures known in the art can be employed to implement the functionality of the afore-mentioned computational devices 10 and 10', including their user interfaces, as well as other embodiments discussed herein. By way of example, as shown schematically in a system diagram 28 of FIG. 3, the device 10 can include a mathematical processing unit (mpu) of the type known in the art that can communicate with the display 14 and the above-described buttons/keys of the device's user interface (e.g., the buttons 16, the keypad 24 and operational keys 26) via an I/O bus 34. The processing unit 30 is also in communication with a program memory 36 via a data bus 38. The programming memory can store instructions for implementing the above mortgage equation (or other equations) to obtain a value for any of its four variables based on entered values of the other three. Some examples of such processors include, without limitation, "Saturn" processors marketed by Hewlett-Packard Company of Palo Alto, Calif., U.S.A., and the family of "H8" microprocessors for embedded systems marketed by Renesas Technology America, Inc. of San Jose, Calif., U.S.A.

By way of example, upon selecting one of the buttons 16 (FIG. 1A) corresponding to a variable (e.g., the monthly payment) for which a value is desired, the mpu 30 can cause the display 14 to present the user with a number of prompts that invite the user to enter values for the other three variables. More specifically, upon entering a value in response to one of the prompts, the mpu can cause the display to provide the user with the next prompt. In response to each prompt, the user can utilize the keypad 24 to transfer a value corresponding to the variable associated with the prompt to the mpu 30.

Once the user enters the value of the last known variable (in response to the last prompt), the mpu calculates the value of the desired variable, based on the above mortgage relation and the entered values of the known variables, and causes the display to present the calculated value to the user. More specifically, the mpu can execute the instructions, based on the above mortgage equation, stored in the memory 36 to obtain a numerical value for the unknown variable. In some implementations, four sets of instructions, each defining the value of one of the variables of the above mortgage equation in terms of known values of the other three, are stored in the memory 36. In response to the selection of a variable by the user (via the user interface) for which a value is desired (i.e., in response to the selection of an unknown variable), the mpu determines (e.g., based on a software-implemented flag) which of the four instructions to execute once the values of the other three variables are entered.

By way of another example, in the device 10', upon selecting one of the buttons 16' (FIG. 2A), the mpu 30 effects presentation of a prompt on the display inviting the user to enter a value of the variable associated with that button. As discussed above, the user can then utilize the numerical keys 24' to transfer a numerical value for that variable to the mpu 30 that, in turn, effects presentation of that value on the display and further stores that value in a register thereof. Values for two additional variables can be similarly transferred to the mathematical processing unit 30. Subsequently, upon selection of the fourth button (i.e., the button associated with the fourth variable), the mpu 30 executes the instructions stored in the memory 36 to obtain a numerical value for the fourth variable. The mpu then effects presentation of the value corresponding to the fourth variable in the display 14.

Figure 4A:
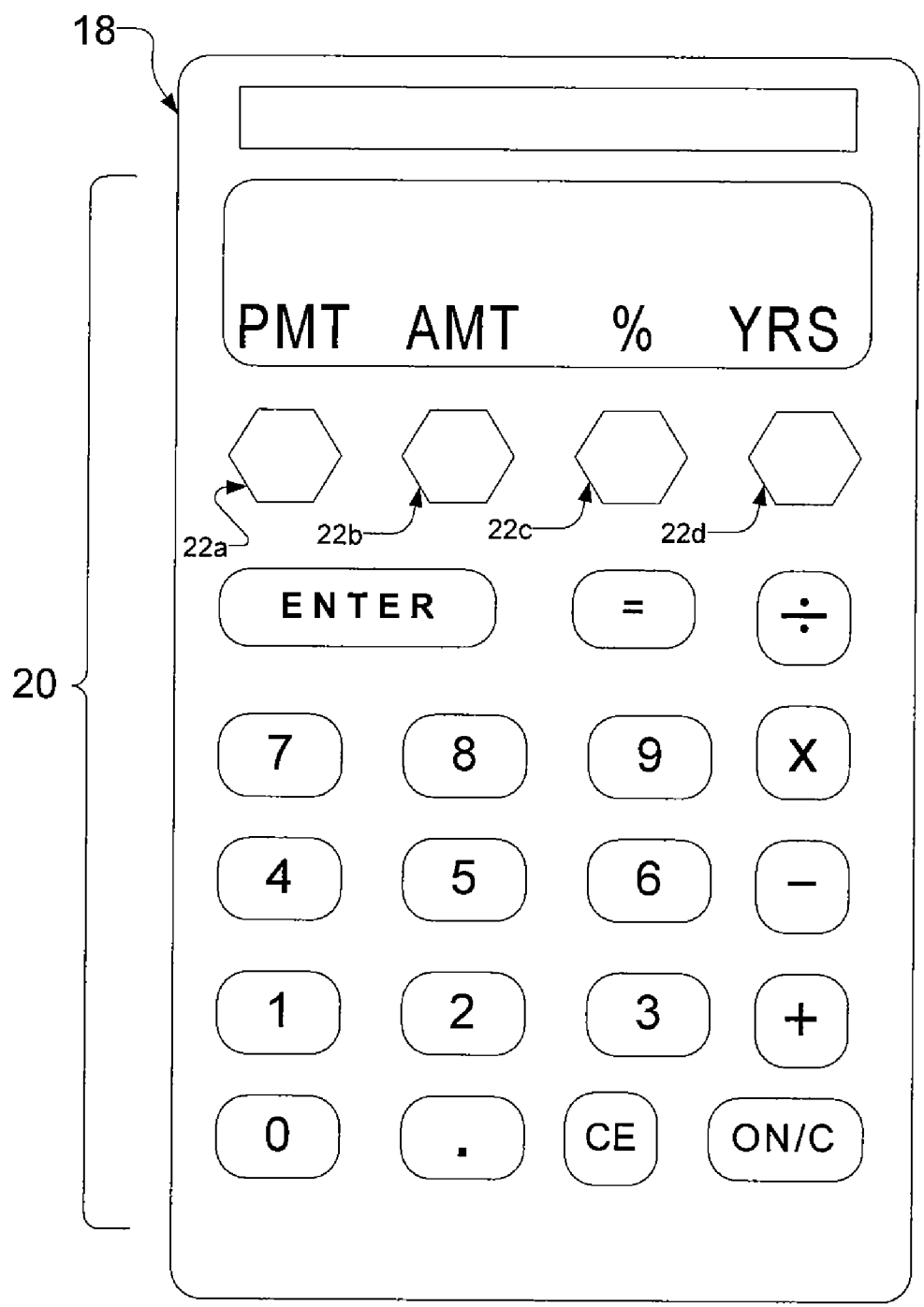
FIG. 4A is a schematic top view of a computational device according to another embodiment of the invention, FIG. 4B schematically depicts that the user interface of the device of FIG. 4A.

The implementation of a computational device of the invention, and in particular its user interface, is not limited to the embodiment discussed above. By way of example, FIG. 4A schematically depicts a computational device 18 according to another embodiment of the invention having a user interface 20 that includes a plurality of software-enabled hard buttons/keys 22a, 22b, 22c and 22d, herein collectively referred to as buttons 22. In some implementations, a user guide that accompanies the device includes instructions on how to programmatically alter the association of the buttons with the variables to which they correspond. Although in this implementation, the buttons themselves are unmarked, in other implementations they can be labeled with selected descriptive markings. For each button, the display 14 presents a textual indicator in proximity thereof (e.g., directly above it in this exemplary embodiment) that informs a user of the variable with which that button is associated. In other embodiments, graphical or combined graphical and textual indicators can also be employed. For example, in this embodiment, in a space directly above the button 22a, the display presents "PMT" indicating that the button is associated with the variable corresponding to the monthly payment. In a similar fashion, the designations "AMT," "%," and "YRS," each of which is presented directly above one of the other buttons 22b, 22c and 22d, inform a user of the variables associated with those buttons.

Figure 4B:
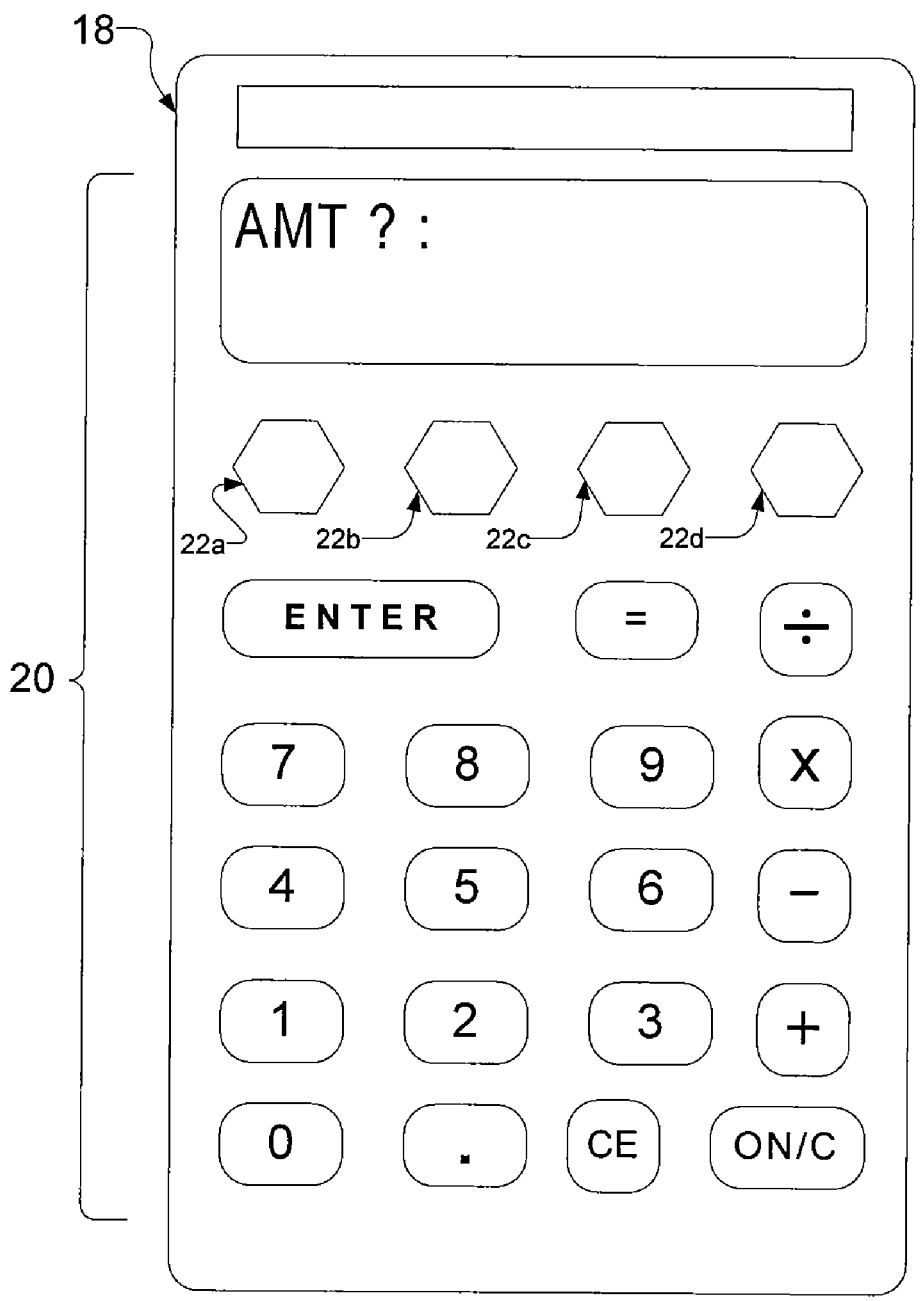

The exemplary device 18 operates in a similar manner as that discussed above in connection with the previous embodiment 10'. More specifically, upon selection of any of the buttons 22, the user is prompted to enter a value for that button, as shown schematically in FIG. 4B for the variable AMT. Once values for three of the variables are entered, the button associated with the fourth variable can be selected to cause the display of its value, calculated based on the assigned values of the other three values. Alternatively, in some implementations, the device 18 operates in a manner similar to that discussed in connection with the computational device 10 above. More specifically, in such an implementation, upon selecting one of the buttons 22, the device prompts the user to enter values for variables associated with the other three buttons. Upon entering the last value, the device calculates and displays the value of the variable associated with the selected button based on the entered values of the other variables.

Figure 5A:
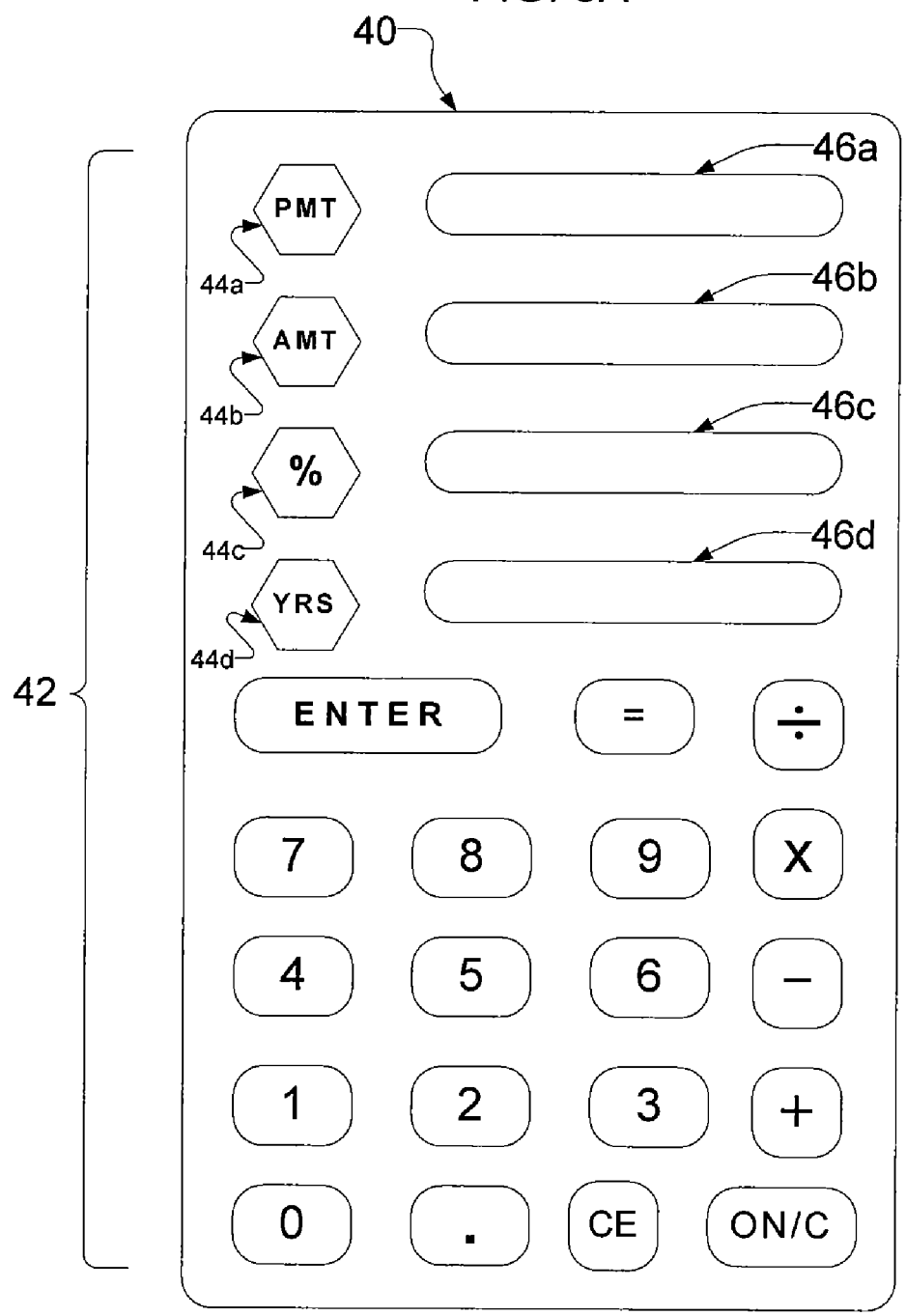
FIG. 5A is a schematic top view of a computational device according to yet another embodiment of the invention.

By way of another example, FIG. 5A schematically depicts another embodiment 40 of a computational device in accordance with the teachings of the invention, which similar to the previous embodiments, can be utilized as a mortgage/loan calculator. More specifically, the device 40 includes a user interface 42 comprising a plurality of buttons/keys 44a, 44b, 44c and 44d, herein collectively referred to as buttons 44, and a plurality of display portions 46a, 46b, 46c and 46d. Each button 44 is associated with one of the display portions 46a-46d. That is, upon selection of each button, a user can enter a value for the variable associated with that button in a display portion corresponding thereto. Alternatively, the selection of a button can cause presentation of a value calculated for that button's associated variable, based on previously entered values of the other variables, in its respective display portion.

Figure 5B:
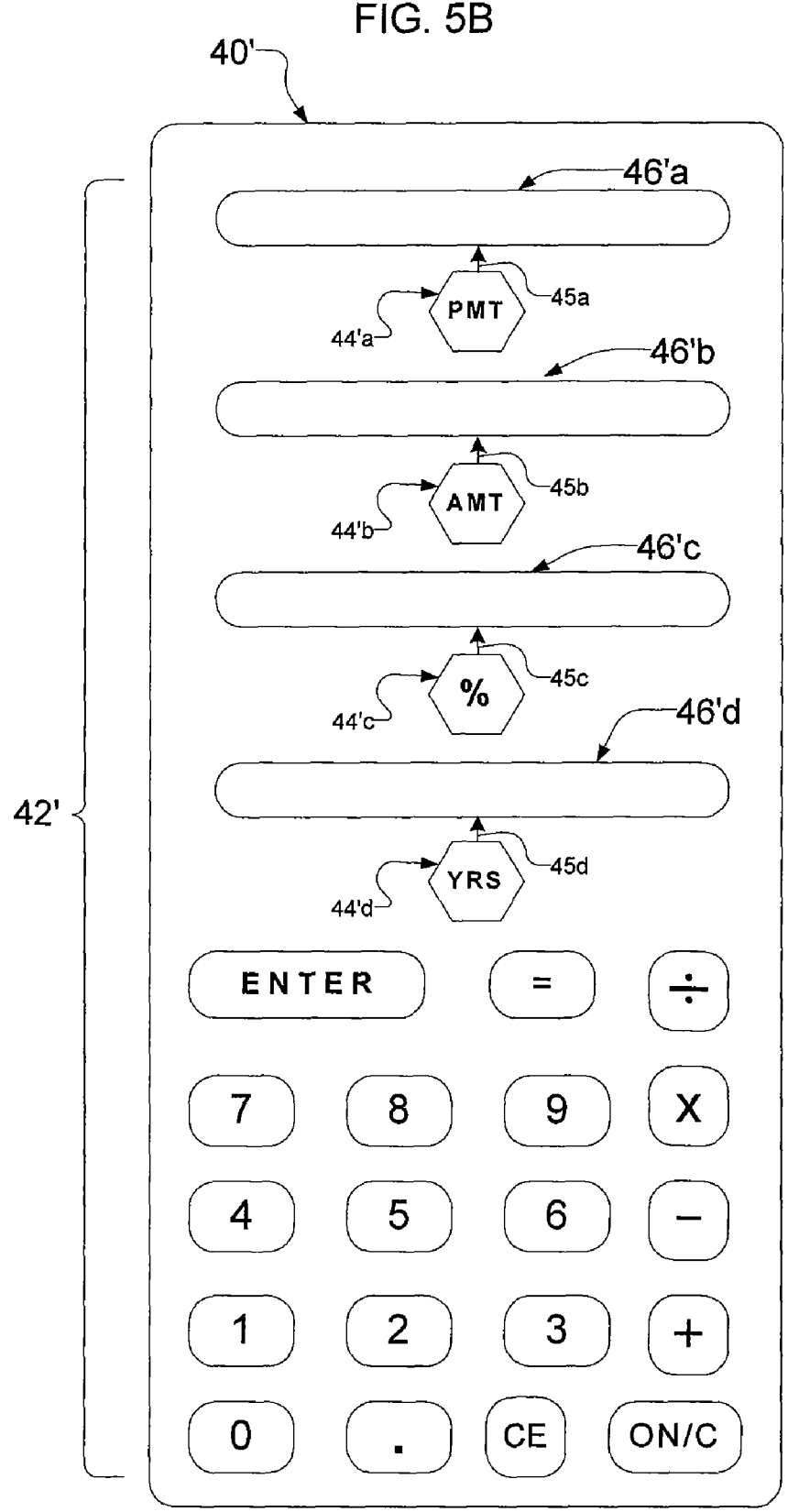
FIG. 5B is a schematic top view of a computational device according to another embodiment of the invention, FIG. 6 schematically depicts another embodiment of a computational device in accordance with the teachings of the invention.

In the exemplary device 40, the association of each button with a display portion is conveyed to a user by placement of that button horizontally adjacent to its respective display portion in substantial alignment therewith. In another embodiment 40', depicted schematically in FIG. 5B, each button (44'a, 44'b, 44'c and 44'd) and its corresponding display portion (46'a, 46'b, 46'c and 46'd) in the user interface 42' are vertically aligned in proximity of one another to convey their association to a user. Additionally, a graphical indicator, e.g., in the form of an arrow, can be optionally provided to connect each button to its associated display portion. For example, in this embodiment, arrows 45a, 45b, 45c and 45d show, respectively, association of buttons 44'a, 44'b, 44'c and 44'd with display portions 46'a, 46'b, 46'c and 46'd.

Referring again to FIG. 5A, the exemplary device 40 can be employed in a similar manner as that described above in connection with the other embodiments. For example, the buttons 44a, 44b, and 44c can be selected to enter values for the variables corresponding to the monthly payment (PMT), the loan amount (AMT), and the annual interest rate (%). Subsequently, the button 44d can be selected to effect calculation of a value for the loan duration (YRS), based on the entered values of the other three, and to effect its presentation in its corresponding display portion 46d. The device 40 can be similarly employed to obtain a value of any of the other variables based on values assigned to the other three. Alternatively, in some implementations, the selection of one of the buttons can cause the device to prompt the user to enter values for variables associated with the other buttons. In such an implementation, once the last value is entered, the device calculates the value of the variable associated with the selected button and presents the calculated value in the display segment corresponding to the selected variable.

Figure 6:
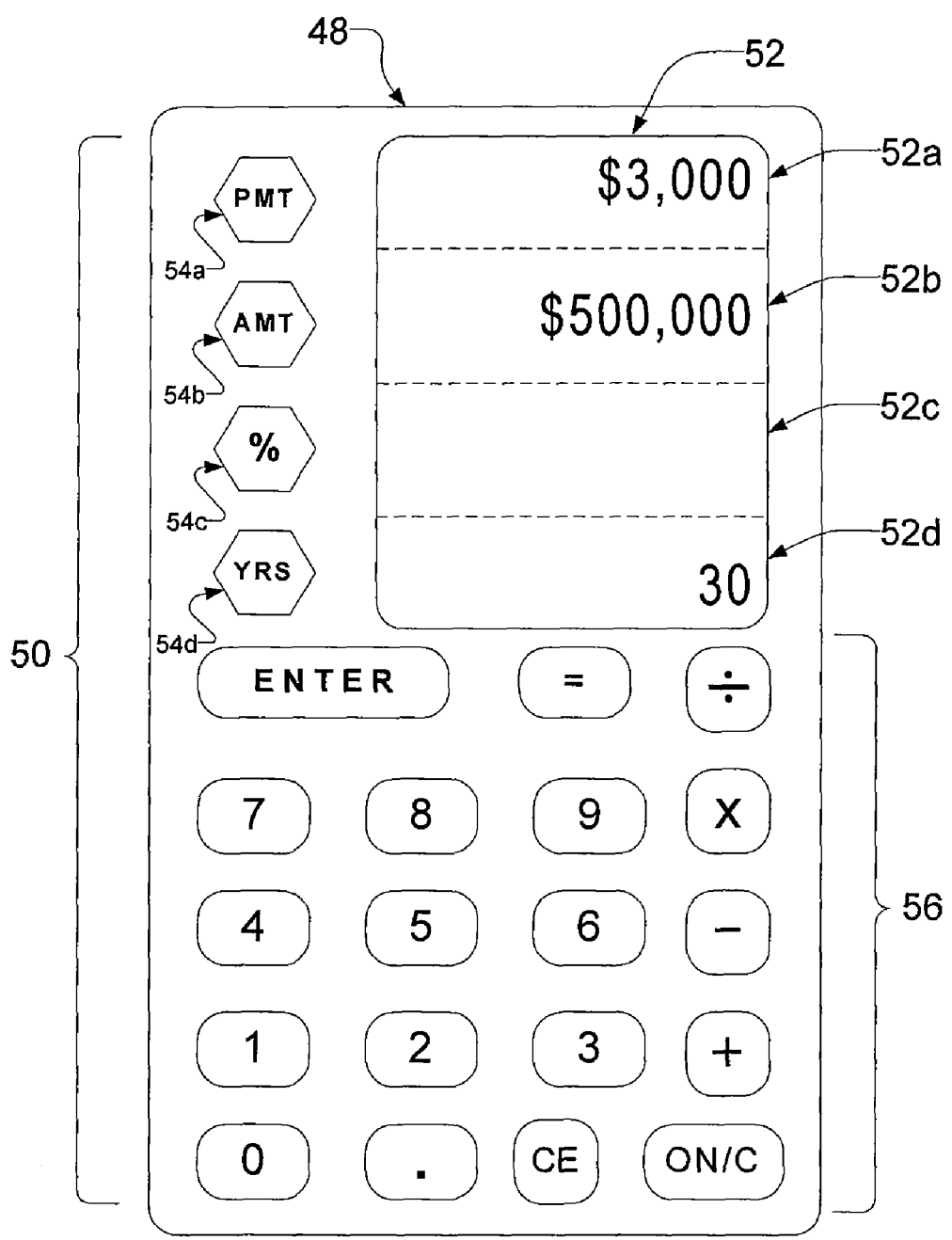

With reference to FIG. 6, in another embodiment 48, rather than providing a plurality of distinct display portions (such as the display portions depicted above in connection with the exemplary devices 40 and 40'), a single display can be logically segmented such that each segment would correspond to one of a plurality of buttons that are, in turn, associated with the variables of the above loan/mortgage equation. For example, the exemplary computational device 48 according to this embodiment of the invention comprises a user interface 50 that includes a display 52 having logical segments 52a, 52b, 52c, and 52d—the dashed lines in the figure are provided for illustrative purposes and are intended to indicate only logical and, not necessarily physical, distinctions among the segments—that are associated, respectively, with a plurality of buttons 54a, 54b, 54c and 54d, herein collectively referred to as buttons 54. The buttons 54a, 54b, 54c and 54d are, in turn, associated with variables monthly payment (PMT), loan amount (AMT), annual interest rate (%), and duration of the loan (YRS).

Further, similar to the previous embodiment, a numerical keypad 56 as well as an ENTER button are provided in the user interface that allow a user to enter values for the above variables in their respective display segments. Moreover, a clear button ("ON/C") is provided that allows clearing the display segments from previously-entered values. In some implementations, selection of the clear button results in clearing the active display segment (the segment being utilized at the time). In some other implementations, a separate "ON/C" button is provided for each display segment in order to allow clearing each display segment independently from the others.

In this embodiment, each button 54 includes a textual indicator that informs a user of the variable with which that button is associated. The shown indicators are identical to those discussed above in the previous embodiments. For example, an indicator "PMT" that labels the button 54a informs the user that that button is associated with the monthly payment variable PMT. In other implementations, other textual or graphical indicators or a combination thereof can be employed. Moreover, in some other implementations, rather than labeling the buttons themselves, each logical display segment can present an indicator (e.g., a textual or graphical icon) that informs a user of the variable with which that segment's button is associated.

With continued reference to FIG. 6, similar to the previous embodiments, a user can readily employ the device 48 to calculate a value for any of the four variables (monthly payment, loan amount, annual interest rate, loan duration) by entering values for the other three. For example, selecting the button 54b (AMT) allows the user to enter a value (e.g., $500,000 in this example) for the amount of the loan in the display segment 52b. The values of two other variables (e.g., monthly payment (PMT) and loan duration (YRS) in this example) can be entered in their respective display segments in a similar fashion (in this example, $3,000 and 30 years, respectively). Subsequently, the fourth button (e.g., the button 54c in this example corresponding to the annual interest rate) can be selected to effect presentation of the value of the variable associated therewith in its respective display segment 52d (an interest rate of 6.00% in this example). Alternatively, in some implementations of the device 48, upon selection of a button corresponding to an unknown variable (i.e., a variable for which a value is desired), the device can prompt the user, e.g., in a manner similar to that discussed in connection with the above embodiments, to enter values of the other three variables. Once the last known variable value is entered, the device calculates the value of the unknown variable and displays the calculated value in the respective logical display segment.

It should be understood that the units associated with the variables of the loan/mortgage equation that are presented above in discussing various embodiments are only for illustrative purposes and are not intended to imply that other units cannot be chosen. In fact, any desired unit can be selected for any of the variables. For example, a computational device of the invention can be readily configured to accept a monthly interest rate, rather an annual rate, and/or accept the loan duration in terms of months, rather than years.

A loan/mortgage calculator according to the teachings of the invention, such as those described above, provides a number of distinct advantages. For example, it provides an easy-to-use interface that enables a user to readily calculate any of the variables associated with the mortgage equation without a need to consult a manual or engage in programming a calculator, which can be time-consuming and is typically beyond the skill scope of many users. Moreover, in many embodiments, the symbols for identifying the functionality of various buttons are chosen to be readily recognized as being associated with variables corresponding to those buttons. For example, the symbol "AMT," which is suggestive of "amount", is employed to identify a loan amount. Further, the handheld implementation of a mortgage calculator of the invention allows the user to readily carry it, e.g., in a shirt pocket. In addition, as discussed in more detail below, many handheld embodiments of a loan/mortgage calculator of the invention are sized and shaped for holding and operating with one hand of the user, thereby further enhancing its ease of use. Moreover, a loan/mortgage calculator of the invention allows a user to calculate any of the variables associated with the loan/mortgage equation by entering values of the others. For example, a user, e.g., a prospective real-estate buyer, can utilize the mortgage calculator to determine the monthly payment associated with a loan characterized by an amount, an annual interest, and a duration. Alternatively, a user can employ the loan/mortgage calculator to calculate, for a given monthly payment and a given loan duration, the loan amount at the prevailing interest rate. In other cases, a user may employ the calculator to determine a loan duration, for given values of the interest rate, monthly payment and the loan amount, or to calculate the interest rate for given values of the monthly payment, the loan amount and the loan duration. Further, a user can utilize the calculator to determine the effective interest rate of a loan. This feature can be useful, e.g., for comparing the effective interest rates associated with two or more loans. For example, two loans having the same nominal amounts can have different effective interest rates due to varying costs associated with obtaining those loans, e.g., origination fees, points, closing cost, attorney's fees, etc.

Figure 7A:
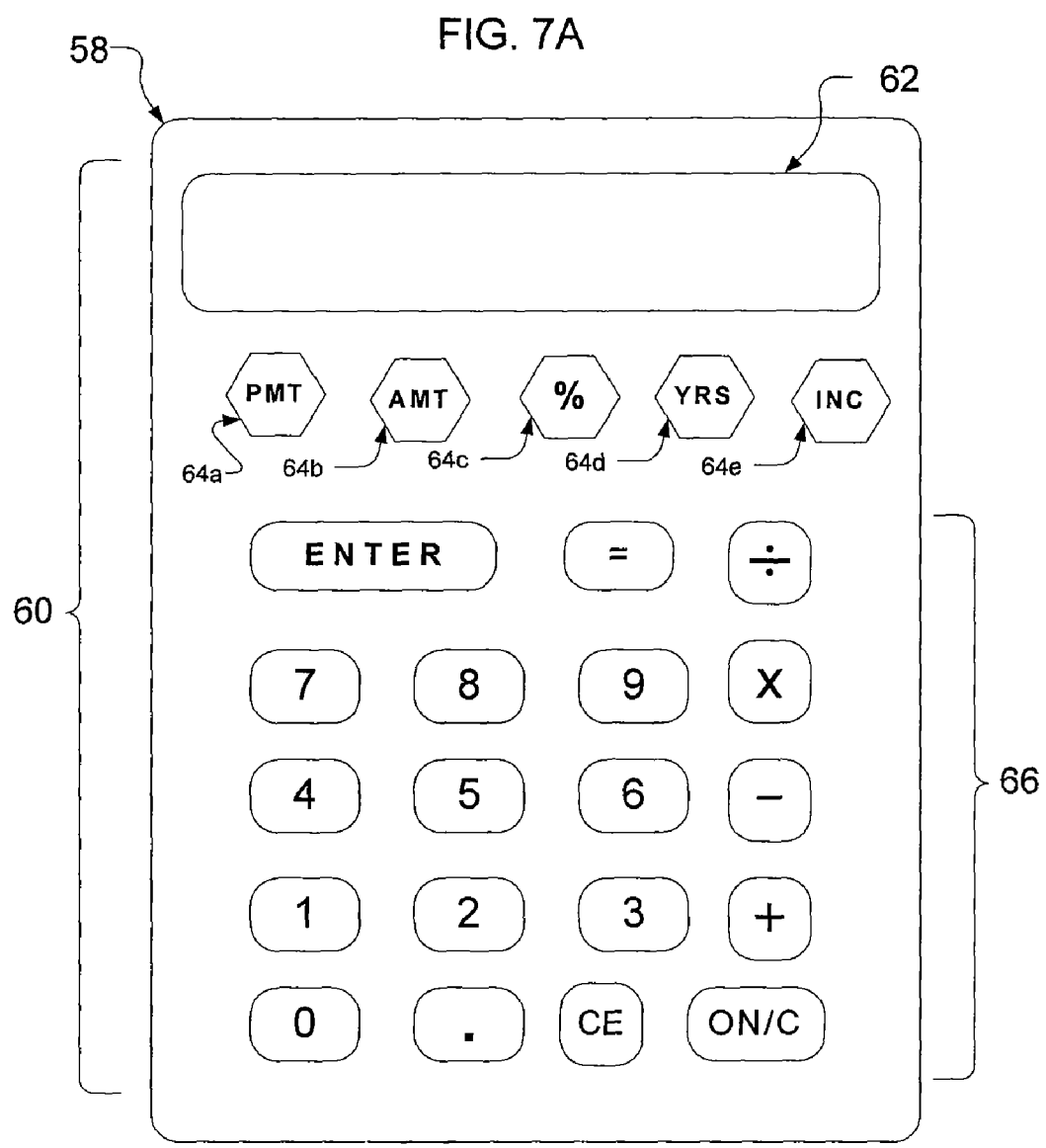
FIG. 7A is a schematic top view of a computational device in accordance with another embodiment of the invention.

In other embodiments, additional functionality can be incorporated in a computational device according to the invention so as to provide a user with an augmented set of options. By way of example, FIG. 7 depicts another handheld loan/mortgage calculator 58 according to a further embodiment of the invention that not only allows a user (e.g., a prospective house purchaser) to calculate values for each variable of the above loan/mortgage equation based on entered values of the other three, but also permits the user to determine a maximum loan/mortgage amount for which that user can qualify based, e.g., on user's yearly income.

More specifically, the exemplary computational device 58 includes a user interface 60 that comprises a display 62, five buttons/keys 64a, 64b, 64c, 64d, and 64e, herein collectively referred to as buttons 64, a numerical keypad 66 including an ENTER key that allows entry of values for variables associated with the buttons 64 and an "ON/C" key for clearing the display. The buttons 64a, 64b, 64c and 64d are associated, respectively, with the monthly payment, the amount of loan, the annual interest rate and the duration of the loan (in years) in a manner similar to that discussed above in connection with the previous embodiments. The additional button 64e allows the user to enter a value for the user's income, e.g., the user's salary.

The exemplary computational device 58 can be utilized in a manner similar to that described above to compute any of the variables of the loan/mortgage equation based on values of the other three. In addition, a user can utilize the device 58 to determine the amount of a loan for which that user is qualified in the following manner. The user can enter values for the interest rate and the loan duration as well as an income (e.g., yearly salary) (by selecting buttons associated with these variables and utilizing the keypad 66, e.g., in a sequential manner). Subsequently, the user can select the button 64b to cause the device to present in the display 62 a maximum amount of a loan for which the user qualifies. By way of example, many lending agencies require that the monthly payment associated with a loan be at most equal to one-third of an applicant's monthly gross (before tax) income. For such a case, the device can be programmed to calculate the user's monthly income from the entered value of the yearly income. The maximum loan amount for which the user qualifies can then be computed by utilizing one-third of the monthly income, or another known default value such as 25% of the income, as the value for the monthly payment, together with the previously-entered values of the interest rate and loan duration, in the above mortgage equation. In other words, the maximum loan amount for which a user can qualify can be obtained from the following relation:

$$L = \frac{\frac{INC}{3} * 100}{R} * \left(1 - \frac{1}{\left(1 + \frac{R}{100*12}\right)^{Y*12}}\right) \quad \text{Eq. (3)}$$

in which L denotes the maximum loan amount, R denotes the annual interest rate, INC denotes the user's annual income, and Y denotes the loan duration (in years). This equation is based on the assumption that the interest is compounded monthly. This equation can be readily modified as known in the art to account for other temporal cycles for compounding the interest.

In some implementations, the device is initially configured with a default value corresponding to the fraction of the monthly income that would correspond to the maximum monthly payment (e.g., one-third in the above example). The user can then be provided with instructions regarding how to program the device to alter that default value.

Alternatively, in some implementations of the device 58, upon selecting the button 64b, the device can prompt the user to enter values for the monthly payment, interest rate, loan duration and the user's income. Once these values are entered, the device can calculate a value of the maximum loan amount for which the user is qualified, and can display the calculated amount in the display 62, e.g., together with a descriptive indicator (e.g., "AMT:").

In some cases, an individual may need to know the maximum price of a real-estate (e.g., a house) that she could afford given her annual income and a down payment, and a selected annual interest rate. An embodiment 68 of a computational device of the invention, depicted schematically in FIG. 7B, allows performing such a calculation, in addition to loan/mortgage calculations discussed above. More specifically, it includes an interface 70 with a display 72 and seven buttons 74a, 74b, 74c, 74d, 74e, 74f, and 74g, herein collectively referred to as buttons 74. The buttons 74a (monthly payment), 74b (loan amount), 74c (annual interest rate) and 74d (loan duration) can be utilized in a manner similar to that described in connection with the previous embodiments to perform loan/mortgage calculations.

The additional buttons 74e, 74f and 74g allow a user to determine the maximum price of a real-estate that she can afford based on her income and a down payment. The button 74e is associated with a variable corresponding to the maximum real-estate (e.g., house) price, and the buttons 74f and 74g relate, respectively, to the values of income and down payment.

Upon entering the values for income and down payment by selecting the buttons 74f and 74g, respectively, the user can select the button 74e to cause the exemplary device 68 to present the maximum real-estate value that the user can afford. More specifically, the device 68 calculates the maximum loan amount for which the user is qualified and adds that value to the entered value of the down payment to arrive at the maximum real-estate value. The device then presents the calculated maximum real-estate value in the display 72.

Figure 8A:
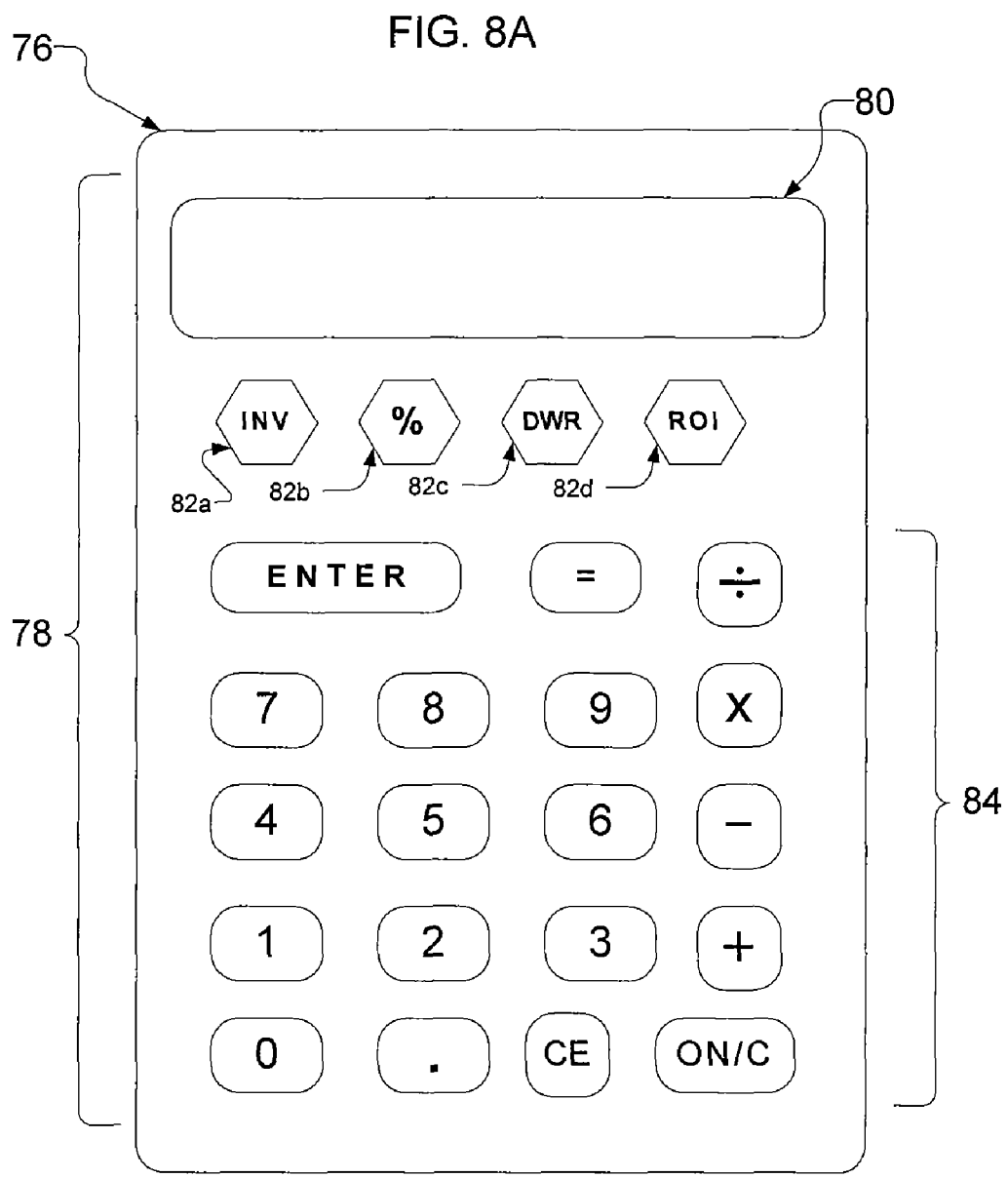
FIG. 8A is a schematic top view of a computational device in accordance with another embodiment of the invention that allows performing return-on-investment calculations.

In yet further embodiments, a computational device of the invention, preferably in a handheld implementation, can be employed to obtain a return on a given investment at a selected interest rate. By way of example, such a computational device can be utilized to readily calculate the return on money invested in a bond or a certificate-of-deposit that provides a guaranteed interest rate over its life time (i.e., over a fixed time period). FIG. 8A schematically illustrates an exemplary embodiment of such a computational device 76 that comprises a user interface 78 having a display 80, four buttons 82a, 82b, 82c, and 82d, as well as a keypad 84. The button 82a (labeled "INV" in this embodiment) is associated with an initial investment (e.g., money needed to buy a bond), while the buttons 82b and 82c relate, respectively, to the interest rate and the duration of the investment. In this exemplary embodiment, the interest rate is assumed to be an annual rate, though other units (e.g., semi-annual) can also be employed. In this implementation, the button 82c allows the user to identify a time cycle (e.g., number of months) over which the interest is compounded (e.g., semi-annual, annual). In other embodiments, a default cycle (e.g., annual) can be utilized, and the button 82c can be eliminated. Further, the button 82d is associated with the return-on-investment (ROI) variable.

A user can enter values for the initial investment, interest rate, duration of the investment, as well as the compound cycle by selecting the buttons associated with these variables. Subsequently, the selection of the button 82d can effect the display of the ROI value in the display 80. More specifically, the device can utilize the following well-known equation for calculating compound interest to calculate the future value of the present investment at the given values of annual interest rate, investment duration and compound cycle (number of times per year interest is compounded):

$$FV = PV\left(1 + \frac{R}{N}\right)^{y*N} \quad \text{Eq. (4)}$$

in which FV refers to the future value of investment, R refers to an annual interest rate, N denotes the compound cycle and Y denotes the investment duration (in units of years in this example).

Figure 3:
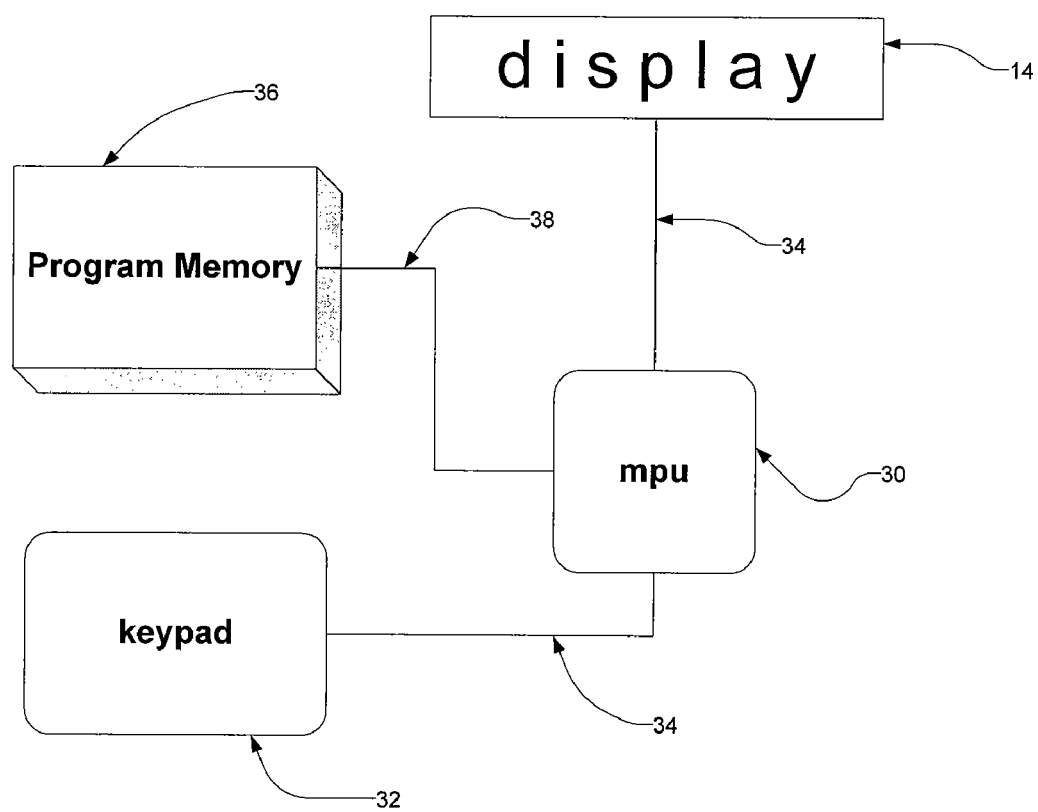
FIG. 3 illustrates an exemplary system architecture suitable for providing the functionalities of computational devices according to the teachings of the invention.

Similar to the above embodiments, the device 76 can include a system architecture, such as that shown in FIG. 3, in which the necessary instructions (computer code) is loaded to calculate the future value of the investment based on the above equation. In some embodiments, this future value can be displayed to the user. Alternatively, the value of the initial investment can be subtracted from the calculated future value to obtain a return-on-investment value to be displayed to the user.

The above device can be used, for example, by a loan officer of a bank to calculate the ROI associated with a loan extended to a customer at a given interest rate. Alternatively, it can be employed by an individual to determine the ROI on buying a certificate-of-deposit. Other uses are apparent to those having ordinary skill in the art.

Figure 8B:
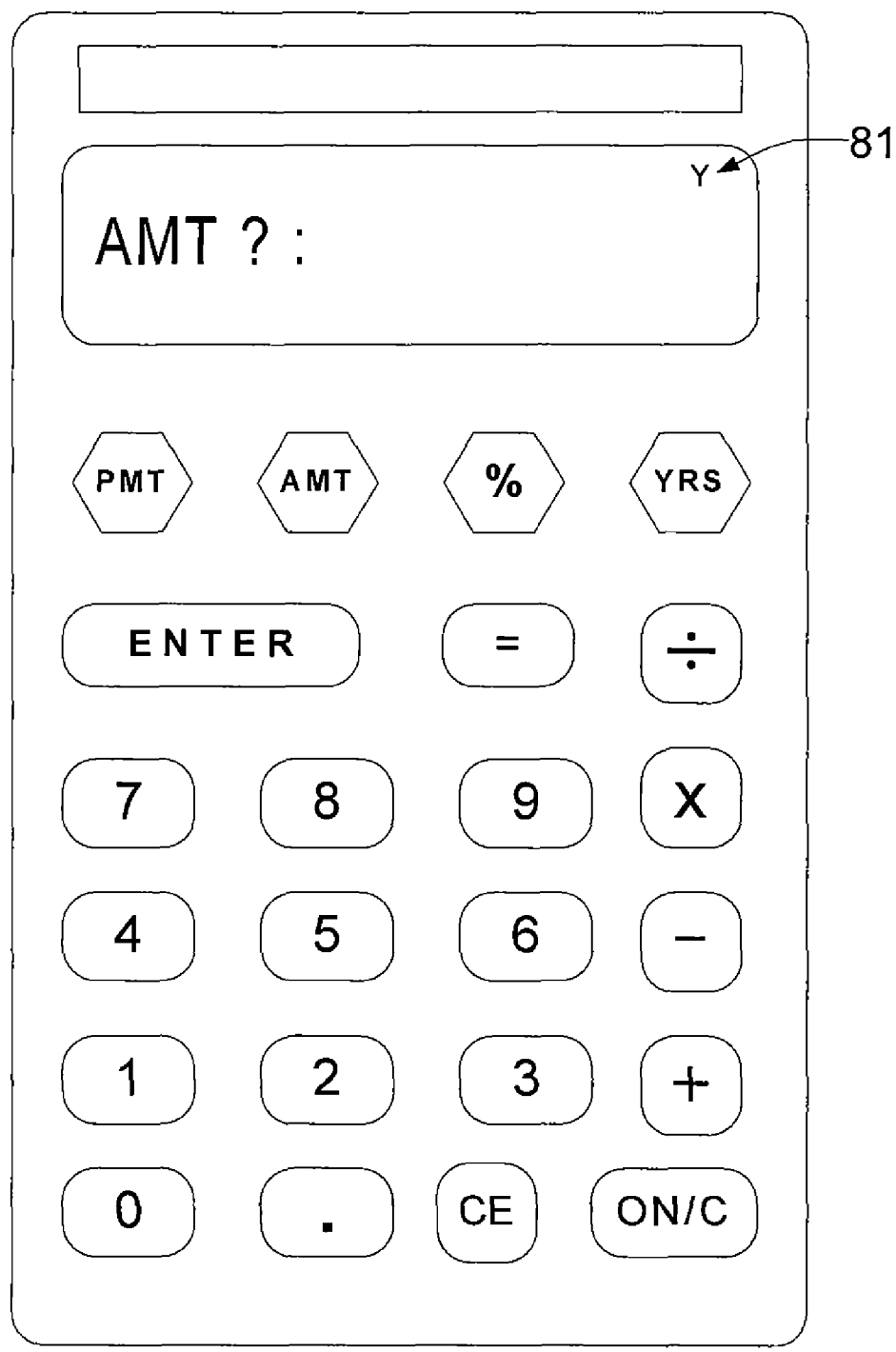
FIG. 8B is a schematic top view of a computational device in accordance with another embodiment of the invention presenting a visual indicator in its display to inform a user that the device is operating in a computational mode in which the unit of years is employed for duration of a loan.
Figure 8C:
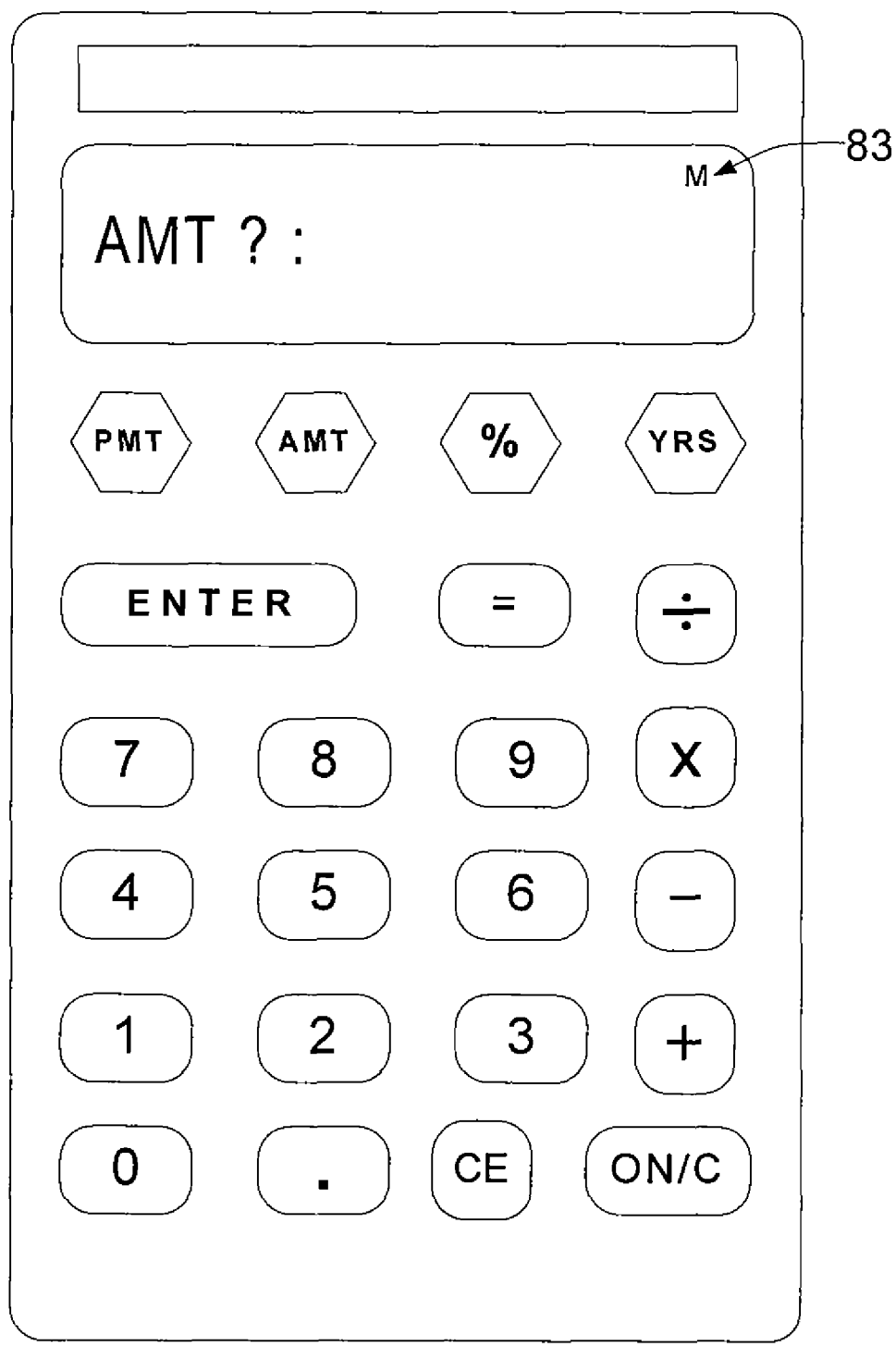
FIG. 8C is a schematic top view of a computational device in accordance with another embodiment of the invention presenting a visual indicator in its display to inform a user that the device is operating in a computational mode in which the unit of months is employed for duration of a loan.

In some embodiments, a visual indicator is presented in the display to indicate a unit (e.g., years or months) associated with the duration of a loan (or an investment), entered by a user or computed by the device. By way of example, FIG. 8B schematically shows such a visual indicator 81 (in the form of letter 'Y') presented in the display of a computational device according to one embodiment of the invention to inform a user that the device is operating in a computational mode in which the unit of years is employed for duration of a loan. In some embodiments, a user can alter the unit associated with the duration of a loan (or an investment) by pressing a predefined sequence of buttons (an instructional manual accompanying the device can inform a user of the sequence). For example, FIG. 8C presents a visual indicator 83 (in the form of letter 'M') to indicate that the device is operating in an alternative computational mode in which the unit of months is employed for duration of a loan.

Figure 8D:
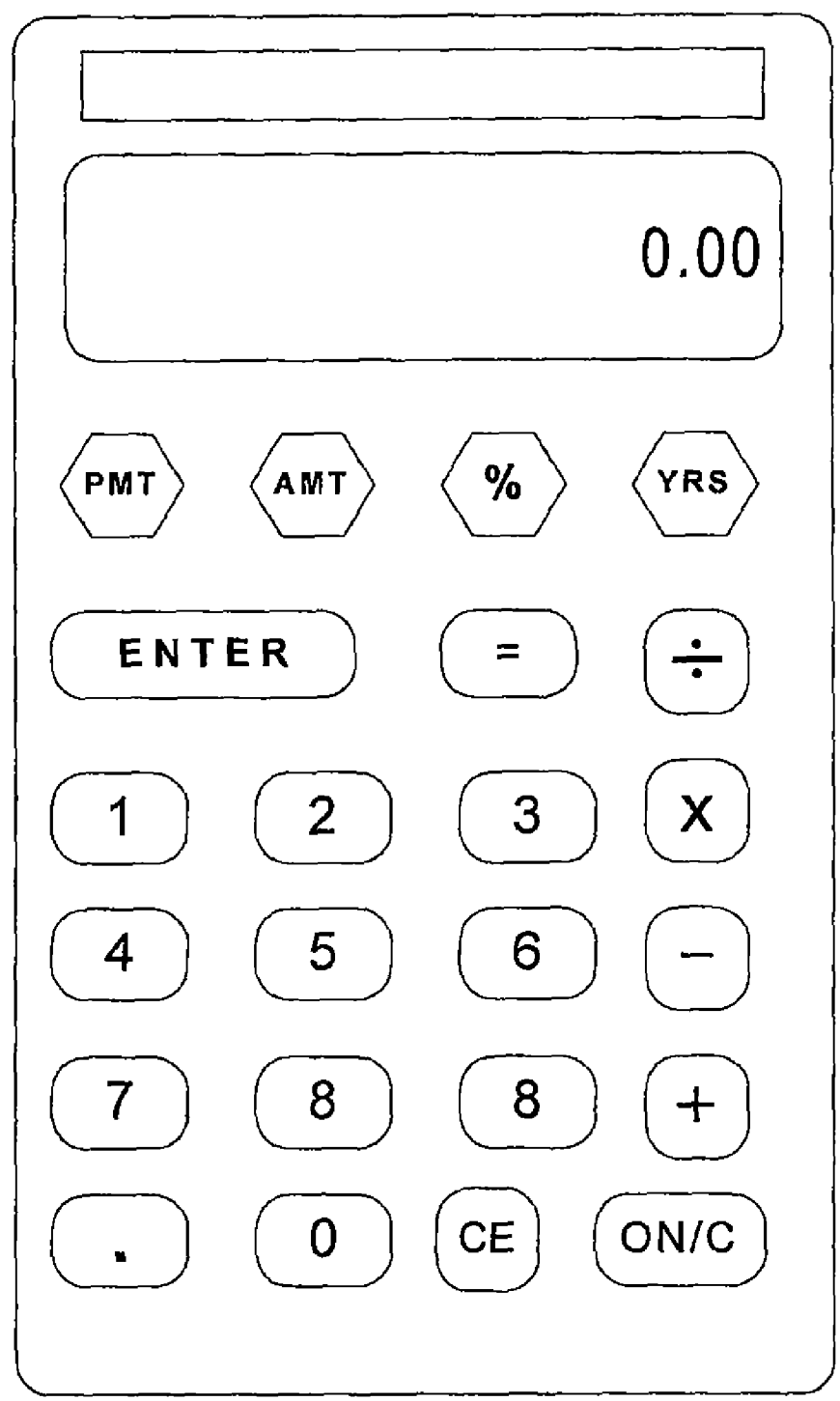
FIG. 8D is a schematic top view of a computational device in accordance with another embodiment of the invention having a keypad with an arrangement of numerical keys that corresponds to that employed in phones, FIG. 9 schematically depicts a handheld computational device according to one embodiment of the invention that is sized and shaped for holding by a single hand of a user, FIG. 10 schematically depicts a back surface of another handheld embodiment of a computational device of the invention having a plurality of grooves on that back surface for providing a frictional fit for two digits of a user's hand for a secure grip of the device while allowing the user to employ other digits of that hand for operating the device, FIG. 11 schematically depicts a back surface of a handheld embodiment of a computational device of the invention having two sleeves on a back surface thereof that allow securely holding the device by two digits of one hand while utilizing one or more of the other digits for operating the device, FIG. 12A schematically depicts the back surface of an embodiment of a computational device according to the teachings of the invention having a hook-and-loop fastener that allows holding the device and simultaneously operating it with one hand, FIG. 12B schematically depicts that the device of FIG. 12A can be held via engagement of one or more digits of a user with the hook-and-loop fastener, FIG. 13 schematically depicts a back surface of another handheld embodiment of a computational device of the invention having a hook-and-loop fastener on a back surface thereof that is attached to a rotatable adjustable cuff for engaging with one or more digits of a user hand for securely holding and simultaneously operating the device by one hand, FIG. 14 schematically depicts a computational device in accordance with another embodiment of the invention that allows a user to calculate the pay-off amount of a loan prior to its end date, FIG. 15 schematically depicts a computational device in accordance with another embodiment of the invention that provides a calendar in its user interface, FIG. 16 schematically depicts a computational device in accordance with another embodiment of the invention that allows a user to calculate a sum of interest payments made for a loan at any desired date during the life span of the loan, and FIG. 17 schematically depicts a computational device in accordance with another embodiment of the invention that allows a user to store information regarding a number of loan, e.g., by assigning a tag to each loan.

In some embodiments of the invention, the arrangement of the numerical keys in the keypad can be different than that discussed above in connection with the previous embodiments. By way of example, FIG. 8D schematically depicts a computational device 85 in accordance with another embodiment of the invention that includes a numerical keypad in which the numerical keys are arranged such that the lower numbers are on the top and the higher numbers are on the bottom. Such an arrangement of the numerical keys may be advantageous to some users who utilize devices, such as telephones, having such keypads, more often than they use conventional calculators having a keypad in which the numerical keys are arranged in a manner similar to that discussed in connection with the previous embodiments.

Figure 9:
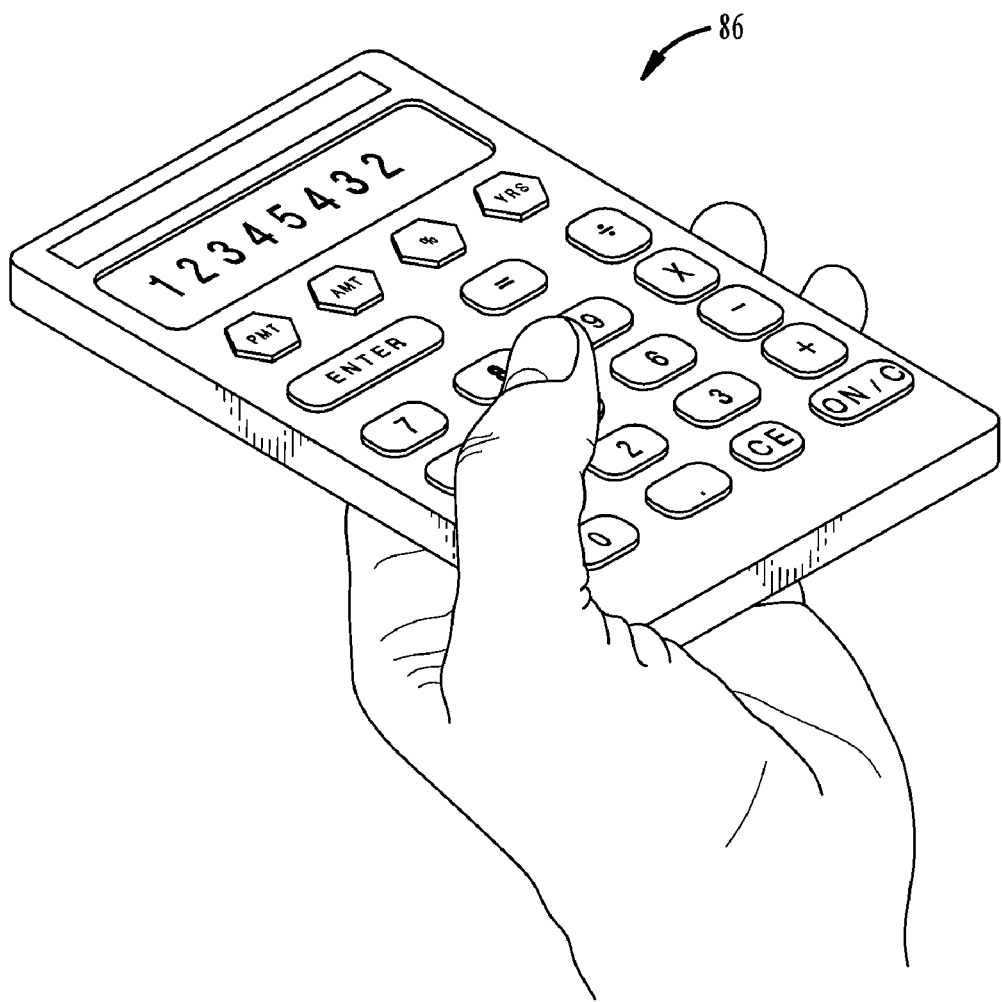

As noted above, many embodiments of a computational device of the invention are handheld to allow their easy portability and use. Moreover, in some preferred embodiments, the computational device is sized and shaped for holding and operating by a single hand of an operator. For example, FIG. 9 schematically depicts an exemplary calculator 86 that can be not only held but also operated by a single hand of a user. For example, the user can hold the calculator against her palm via four fingers of her hand and utilize her thumb to press various buttons to perform a desired computation, e.g., in a manner discussed above.

Figure 10:
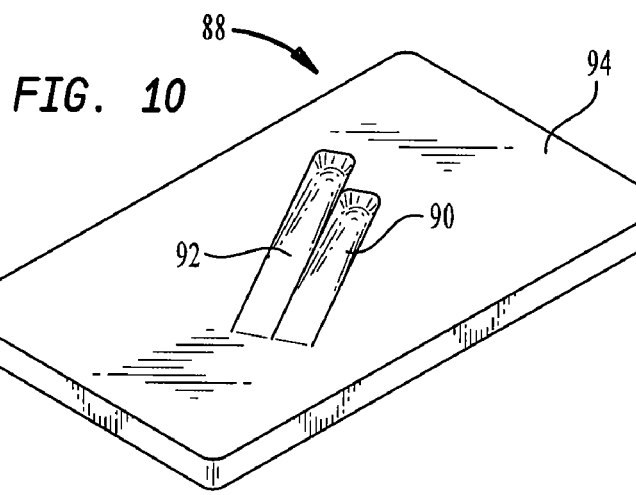
Figure 11:
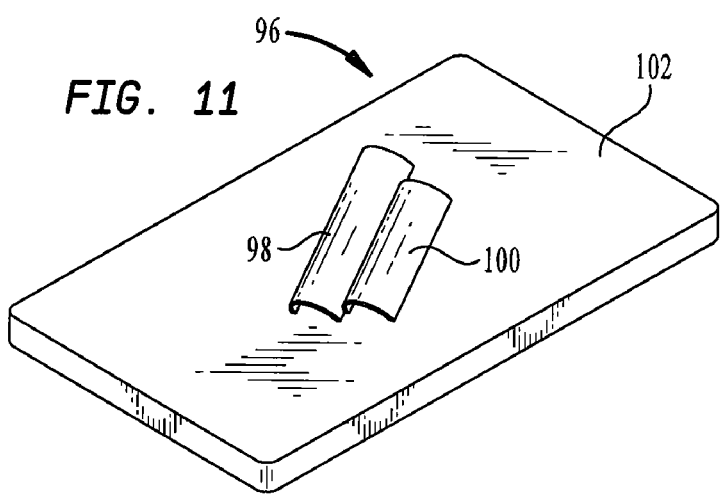

In some embodiments, not only the calculator is sized and shaped for holding and operating by one hand, but it can also include securing elements coupled to its body that can engage with one or more fingers of the user's hand to facilitate its grasp by the user. By way of example, FIG. 10 schematically depicts an exemplary calculator 88 according to such an embodiment of the invention that includes two grooves 90 and 92 are provided on a back surface 94 its housing that provide a frictional fit for two fingers of a user's hand for secure grip of the calculator's body. FIG. 11 shows an alternative embodiment 96 in which two sleeves 98 and 100 are coupled to a back surface 102 of its housing into which two digits of a user's hand can be inserted to securely hold the calculator in one hand while simultaneously operating it (in some embodiments, only one sleeve can be provided). In some embodiments, the sleeves can be made of soft elastic materials, such as those commonly utilized for forming sport gloves. Further, in some embodiments, each sleeve (or some of them) can have not only an opening at one end through which a finger can be inserted into sleeve but can also include an opening at the other end that allows the tip of the finger to be exposed (not covered).

Figure 12A:
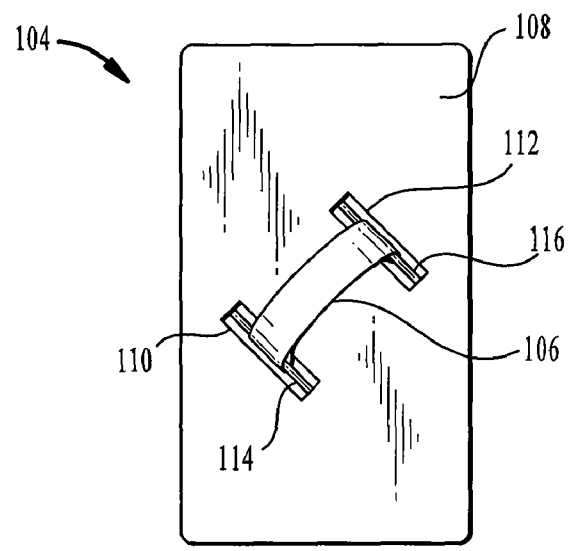
Figure 12B:
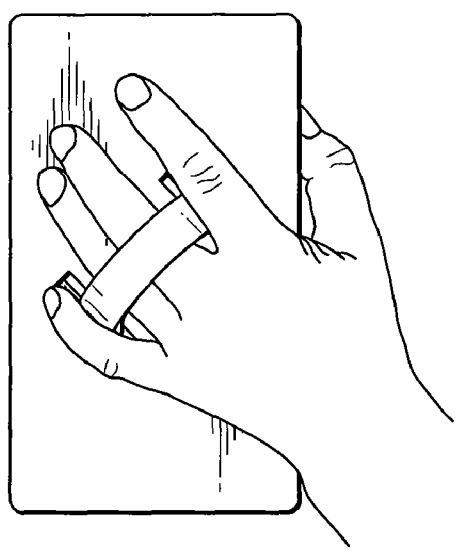

In yet another embodiment, shown schematically in FIG. 12A, a computational device 104 of the invention can include a hook-and-loop fastener (e.g., Velcro™) 106 on a back surface 108 of its housing that allows attaching the device to a user's hand while leaving one more fingers of that hand free for operating the device. More specifically, the back surface 108 includes two indentations 110 and 112 in which cylindrical rods 114 and 116 are, respectively, disposed such that each rod is substantially flush with the back surface 106. The Velcro™ ribbon 106 can be secured to the device by wrapping one end thereof around one of the rods and its other end around the other rod. As shown schematically in FIG. 12B, in use, the ribbon 106 can wrap around one rod, traverse over two (or more) fingers of a user's hand and wrap around the other rod, thereby securing both fingers to the back surface 108 to facilitate holding the device while allowing the user to simultaneously operate the device (e.g., perform data-entry) by utilizing the thumb of that hand. One advantage of such a hook-and-loop fastener is that it can be adjusted once for a particular user, and subsequently be utilized by that user with a need for further adjustments (that is, it can provide custom-fitting for different users).

Figure 13:
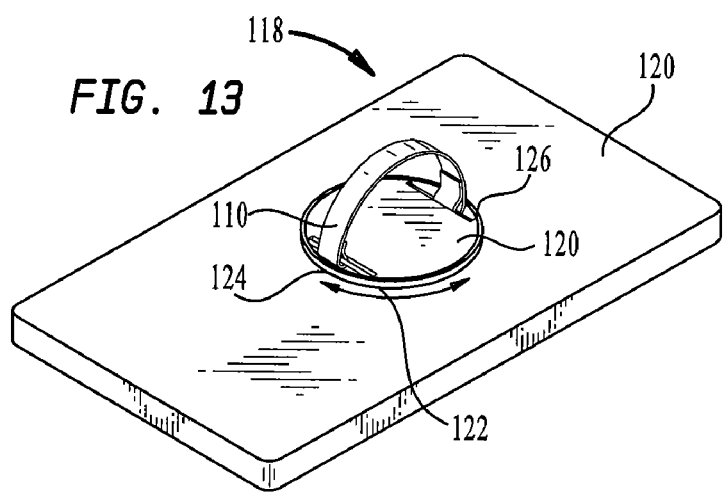

With reference to FIG. 13, in another embodiment 118, a back surface 120 includes a recessed circular well 122 and a rotationally-adjustable cuff 124 that surrounds the well. Two cylindrical bars 124 and 126 coupled to the cuff, which are substantially flush with the back surface 120, allow securing a Velcro ribbon, and hence one or more fingers of a user's hand, to back surface in a manner similar to that discussed above. The cuff can be rotationally adjusted to improve the custom-fitting of the securing structures for different users.

Alternatively, in some embodiment, a combination of some of the above securing elements can be utilized.

Further, the above securing elements can be employed in connection with other electronic devices, such as mobile phones, personal digital assistants (PDAs), and handheld musical devices.

Figure 14:
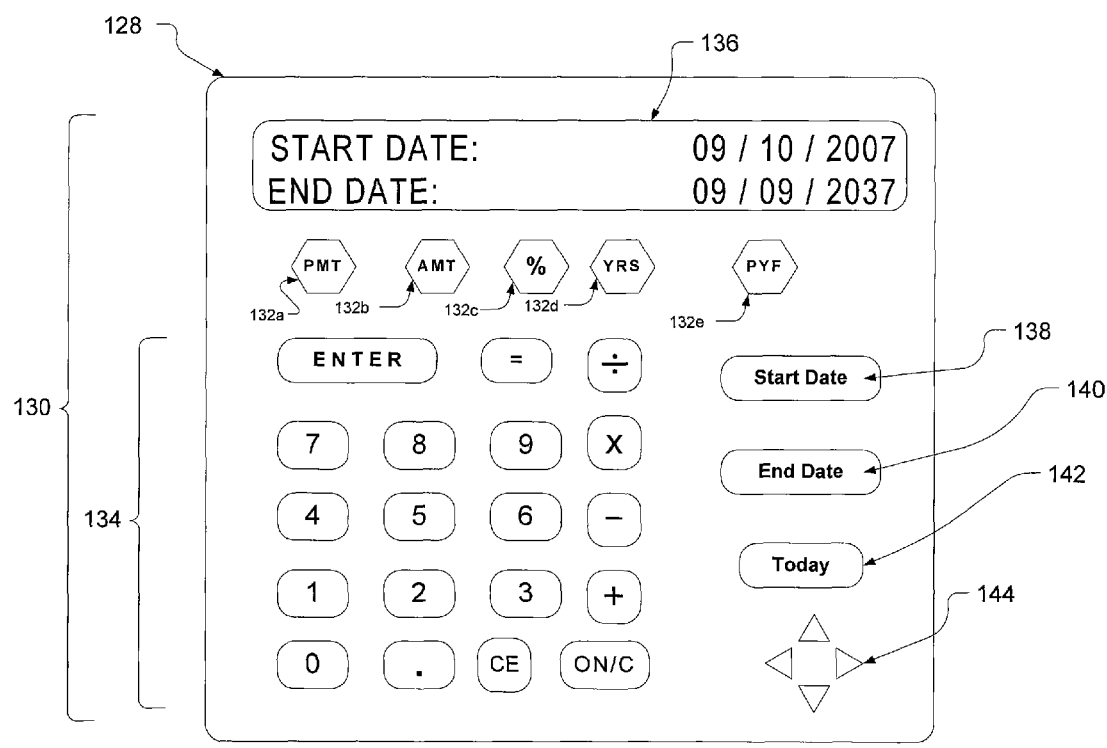

In some embodiments, a computational device according to the teachings of the invention allows a user to calculate a pay-off amount of a given loan, e.g., at a date before the end date of the loan. By way of example, such a pay-off amount is typically requested by a lender when a borrower is paying off the loan before the loan's maturity date, for example, due to refinancing, selling a property or simply paying off a loan before its final date. By way of example, FIG. 14 schematically depicts an exemplary computational device 128 according to such an embodiment having an interface 130 which comprises a plurality of buttons 132a, 132b, 132c, and 132d that are associated with a monthly payment, an amount, an interest rate, and a duration of a loan in a fashion similar to that discussed in connection with the previous embodiments. Further, similar to the other embodiments, the interface 130 also includes a keypad 134 and a display 136. In this embodiment, the interface 130 further includes buttons 138, 140, and 142 labeled, respectively, "Start Date," "End Date," and "Today." The buttons 138 and 140 can be employed by a user to enter the start date and the end date of a loan, respectively, in response to prompts provided in the display 136. The button 142 can be used to enter a date (e.g., current date) at which a pay-off amount of a loan is desired. Further, a collection of buttons 144 enables a user to move the data entry cursor on the display when entering certain data types, e.g., start or end dates of a loan. The interface further includes a button 132e, labeled "PYF," which can be invoked so that the device would calculate and present the pay-off amount, e.g., in a manner discussed below.

By way of example, a user who is interested in determining the pay-off amount of a loan at a given date prior to the end date of the loan can utilize buttons 132b, 132d and 132c to enter the amount, the duration and the interest rate associated with the loan, respectively. Subsequently, the user can enter the start date (or alternatively the end date of the loan) by utilizing the button 138 (or button 140). The user can further employ the button 142 to enter the date at which the pay-off amount is desired. In some embodiments, the device employs the current date (today's date) as the default for the date at which the pay-off amount is desired. The user can change this default date, if needed. Subsequently, the user can press the button 132e ("PYF") to cause the device to calculate, and to display the pay-off amount in the display 136. The mathematical relations for determining the pay-off amount are known. By way of example, the instructions for implementing such mathematical relations can be programmed and stored in a memory module of the device (e.g., the memory 36 shown in the exemplary architecture shown in FIG. 3 above) to be executed by a processor (e.g., the processor shown in FIG. 3) in response to request by the user. Such mathematical relations can also take into account a penalty, if any, for paying off a loan prior to its maturity date.

Figure 15:
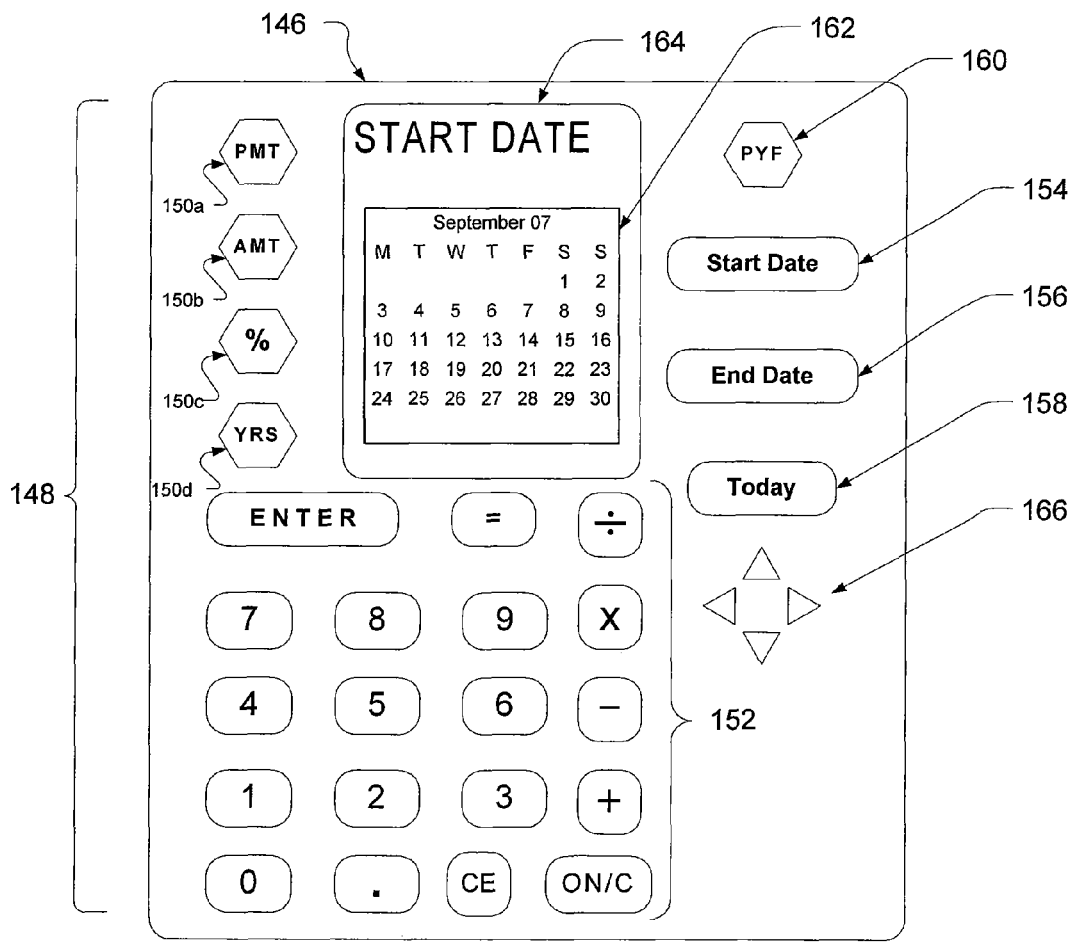

In some embodiments, a computational device of the invention can include a calendar interface element that allows a user to enter a date (or look up the day of the week corresponding to a given date), e.g., to select a date (e.g., start date of a loan) from the calendar or determine the calendar date of the end of the loan. For example, FIG. 15 schematically depicts a device 146 according to another embodiment of the invention that includes an interface 148 having buttons 150a, 150b, 150c and 150d that are associated, respectively, with the monthly payment, the amount, the interest rate and the duration of a loan, as well as a keypad 152 that functions in a manner discussed in connection with the previous embodiments. Moreover, similar to the previous embodiment, buttons 154, 156 are associated, respectively, with the start date and the end date of a loan, and the button 158 allows a user to enter any desired date (e.g., current date). The button 160 is associated with obtaining the pay-off amount of a loan at the date entered via the button 158, e.g., in a manner similar to that discussed above. The exemplary device 146 further includes a display 164. In addition, the interface includes a calendar 162 presented in a portion of the display 164 that can be utilized to enter a date, e.g., the start or end date of a loan. For example, upon pressing the button 154, the device an prompt the user to input the start date of a loan by presenting the message "Start Date" in a portion of the display associated with the calendar. The user can then utilize the buttons 166 to navigate through the calendar to select the month and the day corresponding to the start date (of course, in many embodiments, the user still has the option of using the keypad to the enter the start date). Similarly, the calendar can be utilized to enter the end date (button 156) or the date at which a pay-off amount associated with a loan is needed (button 158). The instructions for implementing known algorithms for calculating the calendar as well as those for presenting it in the display of the device can be stored in a memory module of the device to be utilized by the device's processor. Although the calendar feature is discussed in connection with a particular embodiment, it can also be implemented in other embodiments, such as those described above.

Figure 16:
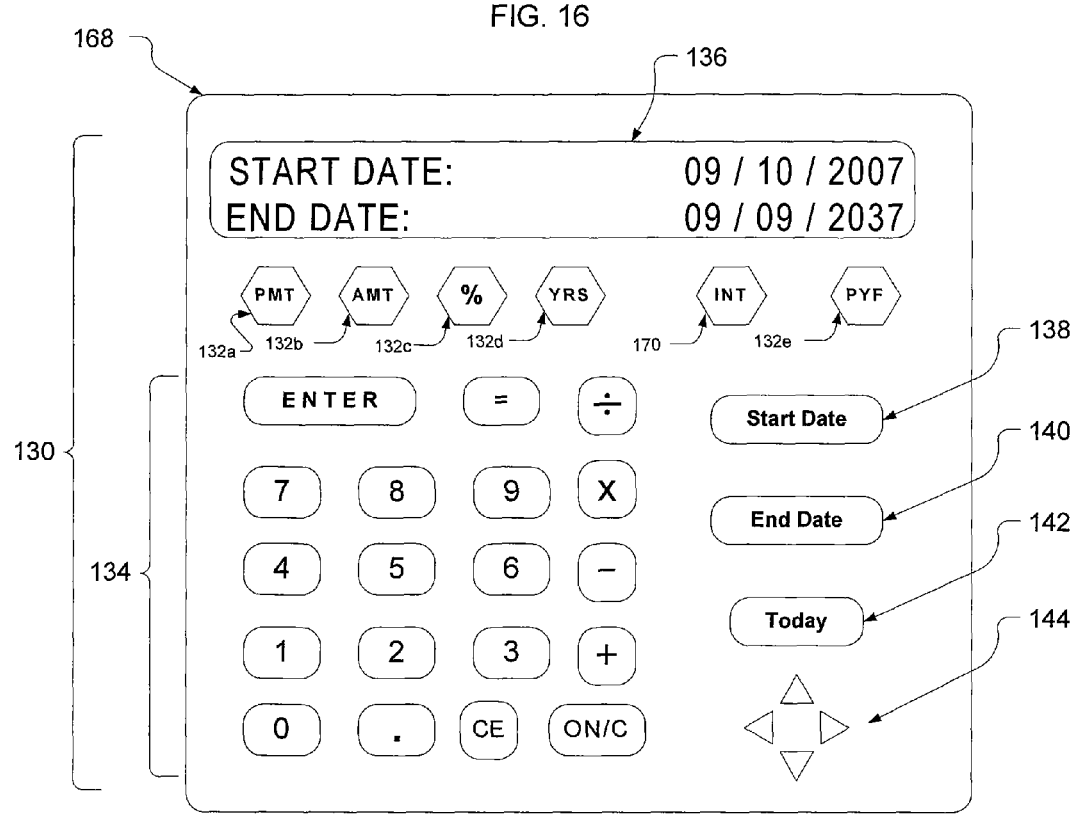

Further, in some embodiments, the device can provide a user with a sum of interest payments for a loan payable during a period from the loan's start date up to a given date. This enables a user to determine how much interest she has to pay for a loan up until the end date of the loan. This allows a user to compare, e.g., two or more loans based on the total (or partial) sum of interest payments required for each loan. By way of example, FIG. 16 schematically shows a computational device 168 according to such an embodiment, which is similar to the above device 128 (FIG. 14) except that its interface also includes a button 170 (e.g., labeled as "INTSUM") that can cause the device to calculate such a sum of interest payments after entry of the relevant loan parameters (e.g., loan amount, loan duration, and the interest rate) as well as the start date (or end date) and the date at which the sum of interest payments is desired (in some embodiments, a button labeled "today" can be provided for entering this date, with the current date utilized as the default date).

Figure 17:
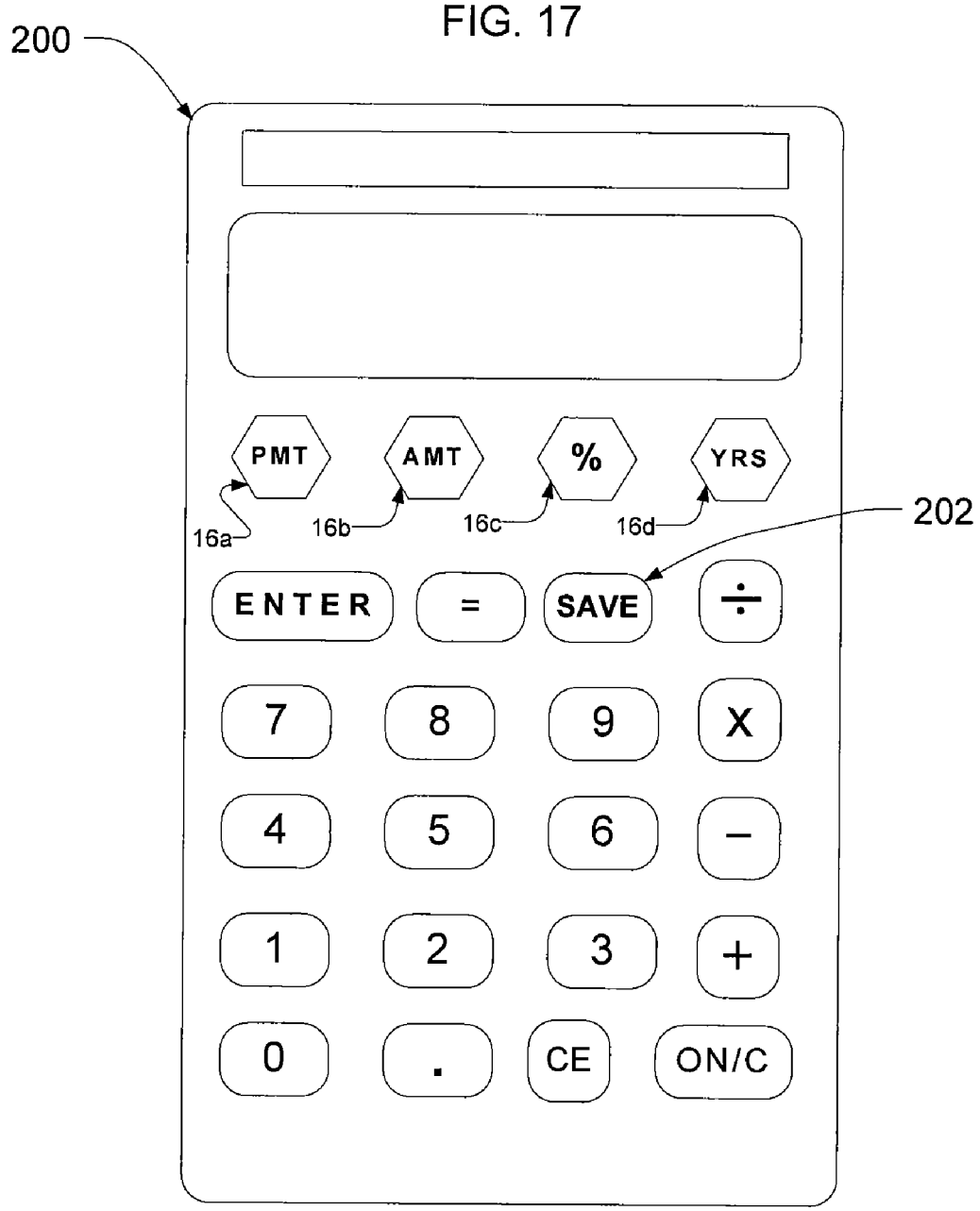

In some embodiments, a computational device of the invention is configured to allow storing information regarding a number of loans (e.g., loan amount, interest rate, duration, monthly payment, and/or start/end date) in its memory. Each loan can be assigned a tag, for example, in the form of a string of alphanumeric characters (e.g., lender/clients names, etc), to distinguish it from other stored loans. By way of example, FIG. 17 schematically depicts a computational device 200 according to one such embodiment having a user interface that includes a "SAVE" button 202 whose invocation prompts the user to enter a tag for a loan whose parameters have been entered by the user and/or calculated by the device.

A computational device of the invention, such as those discussed above, can be configured to communicate with another device or a computer, for example, by employing known wired or wireless communication protocols. This will allow, e.g., bi-directional transfer of information on loans between the device and other devices or computers.

In some embodiments, a computational device of the invention can be utilized for financial planning. For example, as discussed above, in some embodiments, the device can allow a user to determine the maximum loan amount for which the user can qualify. In some embodiments, the device can allow a user to add the monthly cost of borrowing (e.g., one calculated by utilizing the device) to other financial obligations (e.g., tax and insurance) to determine if she can meet all of her financial commitments if she proceeds with obtaining the loan. This will allow the user to decide if she can meet all her financial burdens in addition to the loan's monthly payment. In some cases, in order to further help the user in assessing the financial burden associated with obtaining the loan, the device can provide the yearly property tax associated with purchasing property. For example, the device can be programmed to provide such information based on the price of a piece of real estate in response to the entry of the postal zip code of the real estate.

Those having ordinary skill in the art will appreciate that various changes can be made to the above embodiments of the invention without departing from the scope of the invention.

What is claimed is:

1. A computational device, comprising:
a processor for performing mathematical computations,
a user interface, comprising:
a plurality of functional buttons each associated with one of a plurality of variables in a mathematical equation defining a relationship among said variables,
wherein said mathematical equation comprises a loan equation characterized by any of a simple or compound interest, and
a display,
wherein in response to selection of any of said buttons by a user, said processor effects presentation of one or more prompts in said display to invite the user to enter values for variables associated with buttons other than that selected by the user, and
wherein upon entry of the last variable value, said processor calculates a value for the variable selected by the user and presents said calculated value in the display, and
wherein said device further comprises three additional buttons one of which is associated with entering a start date of the loan, another with entering an end date of the loan and the third with entering a date for which a pay-off amount of the loan is desired.

2. The computational device of claim 1, further comprising a handheld housing in which said processor and said user interface are disposed.

3. The computational device of claim 1, wherein said processor presents a new prompt to the user upon entry of a value for a variable corresponding to a previous prompt.

4. The computational device of claim 1, wherein said mathematical equation comprises a loan equation defining a relationship between four variables including a loan amount, an interest rate, a mortgage duration and a monthly payment.

5. The computational device of claim 1, wherein said mathematical equation comprises a return-on-investment (ROI) equation defining a relation between variables corresponding to an initial investment value, interest rate, investment duration and appreciated investment value.

6. The computational device of claim 1, further comprising a numerical keypad for entering values of said variables.

7. The computational device of claim 1, further comprising a memory module for storing instructions for computing a value of said selected variable based on entered values of the other variables.

8. The computational device of claim 1, wherein said device further comprises another button associated with calculating a pay-off amount of the loan prior to the end date of the loan.

9. The computational device of claim 1, wherein said interface further provides a calendar in a portion of the display.

10. The device of claim 1, wherein said loan equation is characterized by the following relation:

$$P = \frac{L * \left(\frac{R}{100 * 12}\right)}{1 - \frac{1}{\left(1 + \frac{R}{100 * 12}\right)^{(12*Y)}}},$$

wherein L denotes the loan amount, P denotes the monthly payment, Y denotes the loan duration and R denotes the interest rate.

11. A computational device, comprising
a processor, and
a user interface comprising:
a display,
a plurality of functional buttons each associated with one of a plurality of variables in an equation defining a relation among an amount of a loan, the loan duration, an interest rate of the loan, and a periodic payment for paying off the loan,
two additional buttons one of which is associated with entry of a start date or an end date of the loan and the other is associated for entry of a date at which a pay-off amount of the loan is desired,
another button associated with said desired pay-off amount of the loan,
wherein in response to selection of said button associated with the pay-off amount, subsequent to entry of relevant parameters of the loan, the processor calculates the pay-off amount and causes its presentation in said display.

12. The device of claim 11, further comprising a calendar provided in said display for facilitating entry of dates into said device.

13. The device of claim 11, further comprising a handheld housing in which said processor and said user interface are disposed.

14. The device of claim 11, further comprising a numerical keypad for entering values of said variables.

15. A computational device, comprising:
a processor for performing mathematical computations,
a user interface, comprising:
a plurality of functional buttons each associated with one of a plurality of variables in a mathematical equation defining a relationship among said variables,
wherein said mathematical equation comprises a loan equation characterized by any of a simple or compound interest, and
a display, wherein in response to selection of any of said buttons by a user, said processor effects presentation of one or more prompts in said display to invite the user to enter values for variables associated with buttons other than that selected by the user, and wherein upon entry of the last variable value, said processor calculates a value for the variable selected by the user and presents said calculated value in the display, and wherein said device further comprises two additional buttons one of which is associated with entering at least one of a start date of the loan and an end date of the loan and the other associated with entering a date for which a pay-off amount of the loan is desired.

16. The device of claim 15, further comprising a calendar provided in said display for facilitating entry of dates into said device.

17. The device of claim 15, further comprising a handheld housing in which said processor and said user interface are disposed.

18. The device of claim 15, further comprising a numerical keypad for entering values of said variables.

19. The device of claim 15, wherein said loan equation is characterized by the following relation:

$$P = \frac{L * \left(\frac{R}{100 * 12}\right)}{1 - \frac{1}{\left(1 + \frac{R}{100 * 12}\right)^{(12*Y)}}},$$

wherein L denotes the loan amount, P denotes the monthly payment, Y denotes the loan duration and R denotes the interest rate.

* * * * *